(12) United States Patent
Kim et al.

(10) Patent No.: US 11,661,890 B2
(45) Date of Patent: May 30, 2023

(54) ROTOR INCLUDING REPLACEABLE SELF-LOCKING SEALING ASSEMBLY, TURBINE, AND GAS TURBINE INCLUDING THE SAME

(71) Applicants: DOOSAN ENERBILITY CO., LTD., Changwon-si (KR); SDM Siradisi ARGE ve Muhendislik San.Tic. A.S., Istanbul (TR)

(72) Inventors: Jong Seon Kim, Daejeon (KR); Yong Hyun Lim, Gimhae-si (KR); Geon Hwan Cho, Changwon-si (KR); Ali Ihsan Yurddas, Istanbul (TR); Alpcan Uckan, Istanbul (TR); Bora Yazgan, Istanbul (TR); Ercan Akcan, Istanbul (TR); Erdem Gorgun, Istanbul (TR); Ertugrul Tolga Duran, Istanbul (TR); Sadik Hazer, Istanbul (TR); Serdar Taze, Istanbul (TR); Serhan Güler, Istanbul (TR); Mahmut Faruk Aksit, Istanbul (TR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 346 days.

(21) Appl. No.: 16/990,888

(22) Filed: Aug. 11, 2020

(65) Prior Publication Data
US 2021/0108566 A1    Apr. 15, 2021

(30) Foreign Application Priority Data

Aug. 12, 2019 (KR) .................. 10-2019-0098241

(51) Int. Cl.
*F02C 7/28* (2006.01)
*F01D 11/10* (2006.01)
(Continued)

(52) U.S. Cl.
CPC .............. *F02C 7/28* (2013.01); *F01D 11/006* (2013.01); *F01D 11/10* (2013.01); *F02C 3/13* (2013.01); *F01D 5/087* (2013.01); *F01D 15/10* (2013.01)

(58) Field of Classification Search
CPC ........ F01D 11/005; F01D 11/006; F01D 5/06; F02C 7/28; F16J 15/061
See application file for complete search history.

(56) References Cited

U.S. PATENT DOCUMENTS 9,399,926 B2 * 7/2016 Wiebe ........................ F02C 7/28
9,631,507 B2 * 4/2017 Gurao ................... F01D 11/001
(Continued)

FOREIGN PATENT DOCUMENTS

DE   10-2018-112666 A   12/2018
JP        H0810029 B2 *  2/1988
JP      2015-206462 A    11/2015

OTHER PUBLICATIONS

The Office Action dated May 3, 2022 in the corresponding German patent application.

*Primary Examiner* — Topaz L. Elliott
*Assistant Examiner* — Cameron A Corday
(74) *Attorney, Agent, or Firm* — Harvest IP Law LLP

(57) ABSTRACT

A rotor, a turbine, and a gas turbine including the same are provided. The rotor includes a pair of disks rotating about an imaginary central axis and arranged parallel to each other in an axial direction, a replaceable self-locking sealing assembly interposed between the pair of disks, and a fastening section disposed on the sealing assembly to fasten the sealing assembly to the disks. The disk includes a sealing slot disposed on an opposite surface to another adjacent disk and a head slot disposed outward from the sealing slot with respect to a radial direction of the to disk. The sealing assembly includes a main body with one end inserted into (Continued)

the sealing slot through the head slot from an outside of the disk and a sealing head disposed on another end of the main body to be seated on an inner wall of the head slot to restrict the main body from being moved.

20 Claims, 21 Drawing Sheets

(51) Int. Cl.
*F02C 3/13* (2006.01)
*F01D 11/00* (2006.01)
*F01D 15/10* (2006.01)
*F01D 5/08* (2006.01)

(56) References Cited

U.S. PATENT DOCUMENTS

| | | | |
|---|---|---|---|
| 9,808,889 B2 * | 11/2017 | Mitchell | ............... B23K 33/004 |
| 11,280,207 B2 * | 3/2022 | Shemyatovskiy | ........ F01D 5/02 |
| 2006/0239814 A1 * | 10/2006 | Uwami | ................. F01D 11/008 |
| | | | 415/134 |
| 2009/0191050 A1 | 7/2009 | Nereim | |
| 2019/0112938 A1 | 4/2019 | Shemyatovskiy | |

* cited by examiner

ROTOR INCLUDING REPLACEABLE SELF-LOCKING SEALING ASSEMBLY, TURBINE, AND GAS TURBINE INCLUDING THE SAME

CROSS REFERENCE TO RELATED APPLICATION

This application claims priority to Korean Patent Application No. 10-2019-0098241, filed on Aug. 12, 2019, the entire disclosure of which is incorporated herein by reference in its entirety.

BACKGROUND

1. Field

Apparatuses and methods consistent with exemplary embodiments relate to a rotor, a turbine, and a gas turbine and, more particularly, to a rotor cooled by a compressed air supplied from a compressor of a gas turbine and rotated by a combustion gas supplied from a combustor of the gas turbine, and a turbine generating power to generate electricity through the rotor, and a gas turbine including the compressor, the combustor, and the turbine.

2. Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

The gas turbine includes a compressor, a combustor, and a turbine. The compressor includes a plurality of compressor vanes and a plurality of compressor blades alternately arranged in a compressor casing with an air inlet through which air is introduced. The introduced air is compressed by the compressor vanes and the compressor blades while passing through an interior of the compressor.

The combustor mixes the compressed air compressed by the compressor with fuel and ignites a fuel-air mixture with an igniter to generate high-temperature and high-pressure combustion gas. The generated combustion gas is supplied to the turbine.

The turbine includes a plurality of turbine vanes and a plurality of turbine blades alternately arranged in a turbine casing in a multi-stage along a flow direction of combustion gas supplied from the combustor. The turbine blades are rotated by the combustion gas to generate power and the combustion gas is discharged to the outside through a turbine diffuser.

A portion of compressed air compressed by the compressor is extracted from the compressor and supplied to the turbine to cool components of the turbine. The compressed air extracted from the compressor is supplied to an inside of a turbine disk, and circulated inside the turbine disk and the turbine blades to cool them. As described above, because compressed air is supplied to the inside of the turbine disk and combustion gas is supplied to an outside of the turbine disk, a separate sealing component should be attached between adjacent turbine disks.

A component for sealing a space between adjacent turbine disks includes a metal sheet-type sealing member and a fastening-type sealing member. The metal sheet-type sealing member has a problem in that the sealing member cannot effectively dampen vibrations and shocks occurring during the rotation of the turbine disk due to a thickness and rigidity of the sealing member, being damaged. In addition, another problem arises in that after being installed once between the adjacent turbine disks, the sealing member cannot be removed and replaced unless the turbine disks are disassembled. Further, the fastening-type sealing member has a problem in that because the fastening-type sealing member is designed to have a structure in which the sealing member is directly fastened by a fastening component such as a bolt, the fastening portion is subjected to excessive stress concentration or defects due to thermal expansion of the sealing member.

SUMMARY

Aspects of one or more exemplary embodiments provide a rotor having a sealing member capable of being separated and replaced without disassembly of internal components of a turbine, effectively dampening vibrations or shocks caused by rotation of a turbine rotor, and preventing stress concentration or defects from occurring on a fastening portion thereof with the structure in which the sealing member is not fastened directly by a fastening component such as a bolt, a turbine, and a gas turbine including the same.

Additional aspects will be set forth in part in the description which follows and, in part, will become apparent from the description, or may be learned by practice of the exemplary embodiments.

According to an aspect of an exemplary embodiment, there is provided a rotor including: a pair of disks rotating about an imaginary central axis and arranged parallel to each other in an axial direction; a replaceable self-locking sealing assembly interposed between the pair of disks; and a fastening section disposed on the sealing assembly to fasten the sealing assembly to the disks, wherein the disk may include a sealing slot disposed on an opposite surface to another adjacent disk and a head slot disposed outward from the sealing slot with respect to a radial direction of the disk, and the sealing assembly may include a main body with one end inserted into the sealing slot through the head slot from an outside of the disk and a sealing head disposed on another end of the main body to be seated on an inner wall of the head slot to restrict the main body from being moved.

The sealing slot may have a ring shape extending along a circumferential direction of the disk, the disk may include a connection slot disposed in an inclined direction from the sealing slot toward the outside of the disk, the connection slot communicating with the sealing slot and the head slot, and the main body may be inserted into the sealing slot sequentially through the head slot and the connection slot.

The disk may include: an insertion groove formed on an outside of the connection slot so that a tool is inserted into the insertion groove from the outside of the disk; and an outlet groove disposed on an opposite side of the connecting slot based on the head slot to connect the sealing slot and the head slot, the outlet groove being inclined to the sealing slot in a direction opposite to an inclined direction of the connection slot to the sealing slot.

A width of the head slot may be larger than a width of the connection slot based on an axial direction of the disk, and the sealing head may be disposed on an inner wall of the head slot on a side of the connection slot.

An anti-release step may be formed to protrude from an inner wall of the head slot on a side of the insertion groove, and the sealing head may be disposed on an inner side of the anti-release step.

A bolt hole may be formed in an inner wall of the head slot on a side of the sealing slot along a radial direction of the disk, and the sealing head may be disposed in a space between the connection slot and the bolt hole in the head slot, wherein the fastening section may include: a fastening cap inserted into the head slot from the outside of the disk to press the sealing head inward; and a fastening bolt inserted into the bolt hole through the fastening cap to fasten the fastening cap to the disk.

An anti-release step may be formed to protrude from an inner wall of the head slot on an outside of the sealing head toward the fastening cap, and wherein the fastening section may further include a fastening step formed to protrude from the fastening cap toward an inner side of the anti-release step and inserted between the anti-release step and the sealing head.

The main body may include: a sealing plate; a pair of sealing edges formed to face radially outward from the disk, respectively, from both sides of the sealing plate based on a circumferential direction of the disk; and a buffer plate disposed on the outside of the sealing plate such that opposite sides thereof contact the pair of sealing edges, respectively.

The main body may further include an auxiliary plate disposed on an inner side of the sealing plate, wherein opposite sides thereof have a convex curved shape.

The main body may include: a buffer plate; a first sealing edge and a second sealing edge arranged to contact opposite sides of the buffer plate, respectively, based on a circumferential direction of the disk; a first sealing plate formed to face the second sealing edge from an inner side of the first sealing edge based on a radial direction of the disk, such that a width thereof along an axial direction of the disk is smaller than a width of the buffer plate; and a second sealing plate formed to face the first sealing edge from an inner side of the second sealing edge such that the second sealing plate contacts an inner side of the first sealing plate.

The sealing slot may be configured such that the width along the axial direction of the disk gradually increases from an inner side toward an outer side based on the radial direction of the disk, and wherein the first and second sealing edges may be formed such that portions thereof connected to the first and second sealing plates contact opposite inner walls of the sealing slot based on a circumferential direction of the disk.

The sealing slot may be configured such that the width along the axial direction of the disk gradually increases from an inner side toward an outer side based on the radial direction of the disk, and wherein the first and second sealing edges may be formed such that surfaces thereof on an opposite side of the buffer plate come into whole contact with opposite inner walls of the sealing slot based on the circumferential direction of the disk.

The sealing assembly may include a plurality of sealing assemblies such that respective first-side ends thereof are inserted into the sealing slot to face each other, wherein the fastening sections may be respectively disposed on second-side ends of the plurality of sealing assemblies arranged to face each other.

The sealing assembly may include a plurality of sealing assemblies such that a first end of one of the sealing assemblies is inserted into the sealing slot adjacent to a second end of another adjacent sealing assembly, wherein the fastening section may include a plurality of fastening sections respectively disposed on second-side ends of the plurality of sealing assemblies.

According to an aspect of another exemplary embodiment, there is provided a turbine including: a stator including a casing and a plurality of vanes disposed on an inner circumferential surface of the casing in multi-stages along a flow direction of a combustion gas supplied from a combustor of a gas turbine; and a rotor including a plurality of disks disposed in the casing in multi-stages in the flow direction of the combustion gas, a plurality of blades disposed on a radially outer side of the plurality of disks between the plurality of vanes, a sealing assembly disposed on the disk, and a fastening section configured to fasten the sealing assembly to the disk, wherein the disk may include a main disk part on which the blades are disposed and an inter-stage disk part disposed between adjacent main disk parts, wherein the disk may include a sealing slot disposed on an opposite surface to another adjacent disk and a head slot disposed outward from the sealing slot with respect to the radial direction of the disk, the sealing slot and the head slot being disposed on opposite surfaces of the main disk part and the inter-stage disk part, and wherein the sealing assembly may be disposed between the main disk part and the inter-stage disk part that are adjacent to each other, and include a main body with one end inserted into the sealing slot through the head slot from an outside of the disk, and a sealing head disposed on another end of the main body to be seated on an inner wall of the head slot to restrict the main body from being moved.

The sealing slot may have a ring shape extending along a circumferential direction of the disk, the disk may include a connection slot disposed in an inclined direction from the sealing slot toward the outside of the disk, the connection slot communicating with the sealing slot and the head slot, and the main body may be inserted into the sealing slot sequentially through the head slot and the connection slot.

The disk may include: an insertion groove formed on an outside of the connection slot so that a tool is inserted into the insertion groove from the outside of the disk; and an outlet groove disposed on an opposite side of the connecting slot based on the head slot to connect the sealing slot and the head slot, the outlet groove being inclined to the sealing slot in a direction opposite to an inclined direction of the connection slot to the sealing slot.

According to an aspect of another exemplary embodiment, there is provided a gas turbine including: a compressor configured to compress air drawn thereinto from an outside; a combustor configured to mix the compressed air supplied from the compressor with fuel and combust the air-fuel mixture; and a turbine configured to be rotated by the combustion gas supplied from the combustor to generate power for generating electricity, wherein the turbine may include: a stator including a casing and a plurality of vanes disposed on an inner circumferential surface of the casing in multi-stages along a flow direction of the combustion gas; and a rotor including a plurality of disks disposed in the casing in multi-stages in the flow direction of the combustion gas, a plurality of blades disposed on a radially outer side of the plurality of disks between the plurality of vanes, a sealing assembly disposed on the disk, and a fastening section configured to fasten the sealing assembly to the disk, wherein the disk may include a main disk part on which the blades are disposed and an inter-stage disk part disposed between adjacent main disk parts, wherein the disk may include a sealing slot disposed on an opposite surface to another adjacent disk and a head slot disposed outward from the sealing slot with respect to the radial direction of the disk, the sealing slot and the head slot being disposed on opposite surfaces of the main disk part and the inter-stage disk part, and wherein the sealing assembly may be disposed between the main disk part and the inter-stage disk part that are adjacent to each other, and include a main body with one end inserted into the sealing slot through the head slot from an outside of the disk, and a sealing head disposed on another end of the main body to be seated on an inner wall of the head slot to restrict the main body from being moved.

The sealing slot may have a ring shape extending along a circumferential direction of the disk, the disk may include a connection slot disposed in an inclined direction from the sealing slot toward the outside of the disk, the connection slot communicating with the sealing slot and the head slot, and the main body may be inserted into the sealing slot sequentially through the head slot and the connection slot.

The disk may include: an insertion groove formed on an outside of the connection slot so that a tool is inserted into the insertion groove from the outside of the disk; and an outlet groove disposed on an opposite side of the connecting slot based on the head slot to connect the sealing slot and the head slot, the outlet groove being inclined to the sealing slot in a direction opposite to an inclined direction of the connection slot to the sealing slot.

According to the rotor, the turbine and the gas turbine including the same, the sealing assembly having the main body of which one end is inserted into the sealing slot through the head slot formed on the turbine disk and the sealing head disposed on the other end of the main body to be seated on the inner wall of the head slot to prevent the movement of the main body is provided so that if the sealing assembly is installed on the turbine disk, one end of the sealing assembly is inserted into the head slot and the sealing slot, and if the sealing assembly is separated from the turbine disk, the other end of the sealing assembly is drawn out, thereby replacing the sealing assembly. Therefore, according to the rotor, the turbine and the gas turbine including the same, the sealing assembly can be easily separated and replaced from the turbine disk without disassembling the turbine disk.

In addition, according to the rotor, the turbine and the gas turbine including the same, the main body includes the sealing plate, the pair of sealing edges formed on both sides of the sealing plate, and the buffer plate disposed between the pair of sealing edges, thereby not only effectively sealing the space between the adjacent turbine disks, but also effectively dampening vibrations or shocks occurring due to the rotation of the rotor.

Furthermore, according to the rotor, the turbine and the gas turbine including the same, the rotor is configured such that the sealing head is disposed in the space between the connection slot and the bolt hole, and the fastening bolt passes through the bolt hole through the fixing cap seated on the outside of the sealing head, thereby avoiding that the sealing head is fastened to the turbine disk with direct penetration of the fastening bolt through the sealing head. Therefore, according to the rotor, the turbine, and the gas turbine including the same, it is possible to prevent the occurrence of stress concentration and defects in the fastening portion, which may occur when the fastening bolt penetrates directly through the sealing head.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
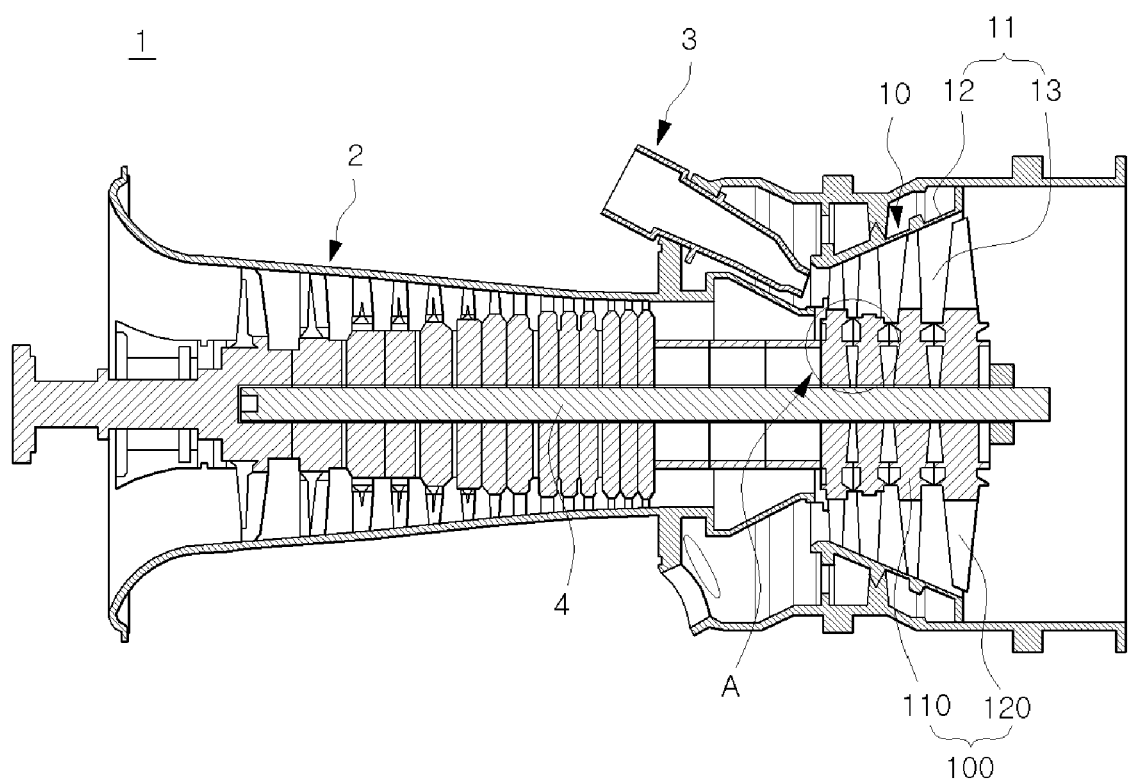
FIG. 1 is a cross-sectional view illustrating a gas turbine according to a first exemplary embodiment.

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a rotor, a turbine, and a gas turbine including the same according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a cross-sectional view illustrating a gas turbine according to a first exemplary embodiment. Referring to FIG. 1, the gas turbine 1 includes a compressor 2, a combustor 3, and a turbine 10. In a flow direction of gas, the compressor 2 is disposed on an upstream side of the gas turbine 1, and the turbine 10 is disposed on a downstream side of the gas turbine 1. The combustor 3 is disposed between the compressor 2 and the turbine 10.

The compressor 2 includes compressor vanes and a compressor rotor including a compressor disk and compressor blades in a compressor casing. The turbine 10 includes turbine vanes 13 and a turbine rotor 100 including a turbine disk and turbine blades in a turbine casing 12. The compressor vanes and the compressor blades are arranged in a multi-stage along a flow direction of compressed air, and the turbine vanes 13 and the turbine blades are also arranged in a multi-stage along a flow direction of combustion gas. The compressor 2 has an internal space of which volume decreases from a front-stage toward a rear-stage so that the introduced air can be compressed. In contrast, the turbine 10 has an internal space of which volume increases from a front-stage toward a rear-stage so that the combustion gas supplied from the combustor 3 can expand.

On the other hand, between the compressor rotor located on a rear end side of the compressor 2 and the turbine rotor 100 located on a front end side of the turbine 10, a torque tube is disposed as a torque transmission member to transmit a rotational torque generated by the turbine 10 to the compressor 2. Although the torque tube may include a plurality of torque tube disks arranged in three stages in total as illustrated in FIG. 1, this is only an example, and the torque tube may include a plurality of torque tube disks arranged in four or more stages or two or less stages.

The compressor rotor includes a compressor disk and a plurality of compressor blades. A plurality of compressor disks may be provided in the compressor casing, and each of the compressor disks is fastened so as not to be spaced apart in an axial direction by a tie rod 4. That is, each of the compressor disks is aligned along the axial direction with the tie rod 4 passing through a central portion thereof. In addition, adjacent compressor disks are arranged such that opposing surfaces of the adjacent compressor disks are compressed by the tie rod 4 so that the adjacent compressor disks cannot rotate relative to each other.

The plurality of compressor blades are radially coupled to an outer circumferential surface of the compressor disk in a multi-stage. Further, the plurality of compressor vanes are arranged in a multi-stage on an inner circumferential surface of the compressor casing such that each stage of compressor vanes is disposed between adjacent stages of compressor blades. While the compressor rotor disks rotate along with a rotation of the tie rod 4, the compressor vanes fixed to the compressor casing do not rotate. The compressor vanes guide the flow of the compressed air moved from front-stage compressor blades to rear-stage compressor blades. Here, the compressor casing and the compressor vanes may be defined as a compressor stator to distinguish them from the compressor rotor.

The tie rod 4 is arranged to penetrate the center of the plurality of compressor disks and turbine disks such that one end thereof is fastened in the compressor disk located on a foremost end side of the compressor and the other end thereof is fastened by a fastening nut.

Because the tie rod 4 may be formed in various structures depending on a gas turbine, a shape of the tie rod 4 is not limited to the shape illustrated in FIG. 1. That is, one tie rod 4 may have a form in which the tie rod passes through the central portion of the compressor disks and the turbine disks, a form in which the plurality of tie rods 4 are arranged in a circumferential manner, or a combination thereof.

Also, the compressor may include a deswirler that serves as a guide vane configured to control an actual inflow angle of the fluid entering into an inlet of the combustor so that the actual inflow angle matches a designed inflow angle.

The combustor 3 mixes the introduced compressed air with fuel and combusts the air-fuel mixture to produce high-temperature and high-pressure combustion gas with high energy, thereby raising the temperature of the combustion gas a temperature at which the combustor and the turbine are able to be resistant to heat through an isothermal combustion process.

A plurality of combustors constituting the combustor 3 may be arranged in a form of a cell in a combustor casing. Each combustor includes a nozzle for injecting fuel, a liner defining a combustion chamber, and a transition piece serving as a connector between the combustor and the turbine.

The liner provides a combustion space in which fuel injected from a fuel nozzle is mixed with compressed air supplied from the compressor and burned. The liner includes a combustion chamber that provides the combustion space in which the fuel-air mixture is burned, and an annular flow path that surrounds the combustion chamber to provide an annular space. The fuel injection nozzle is coupled to a front side of the liner, and an igniter is coupled to a sidewall of the liner.

In the annular flow path, compressed air introduced through a plurality of holes provided in an outer wall of the liner flows, and the compressed air that cooled the transition piece also flows. Therefore, as the compressed air flows along an outer wall of the liner, it is possible to prevent the liner from being thermally damaged by high temperature combustion gas.

The transition piece is connected to a rear side of the liner to deliver the combustion gas toward the turbine. The transition piece includes an annular flow path surrounding an inner space of the transition piece. As the compressed air flows along the annular flow path, an outer wall of the transition piece is cooled by the compressed air to prevent damage by high temperature combustion gas.

The high-temperature and high-pressure combustion gas supplied to the turbine 10 expands while passing through the turbine 10, and accordingly, impulses and reaction forces are applied to the turbine blades 120 to generate rotational torque. The resultant rotational torque is transmitted to the compressor 2 through the above-described torque tube, and an excess of the power required to drive the compressor 2 is used to drive a generator or the like.

The turbine 10 is basically similar in structure to the compressor 2. That is, the turbine 10 may include a plurality of turbine rotors 100 similar to the compressor rotor of the compressor 2. The turbine rotor 100 includes a turbine disk 110 and a plurality of turbine blades 120 radially disposed around the turbine disk 110. The turbine disk 110 and the plurality of turbine blades 120 are designed in a structure in which they are arranged in a multi-stage to be spaced apart from each other along a flow direction of the combustion gas. The plurality of turbine vanes 13 are annually arranged in a multi-stage on an inner circumferential surface of the turbine casing 12 such that each stage of turbine vanes 13 is disposed between adjacent stages of turbine blades 120 to guide a flow direction of the compressed air passing through the turbine blades 120. Here, the turbine casing 12 and the turbine vanes 13 may be defined as a turbine stator 11 to distinguish them from the turbine rotor 100.

Figure 2:
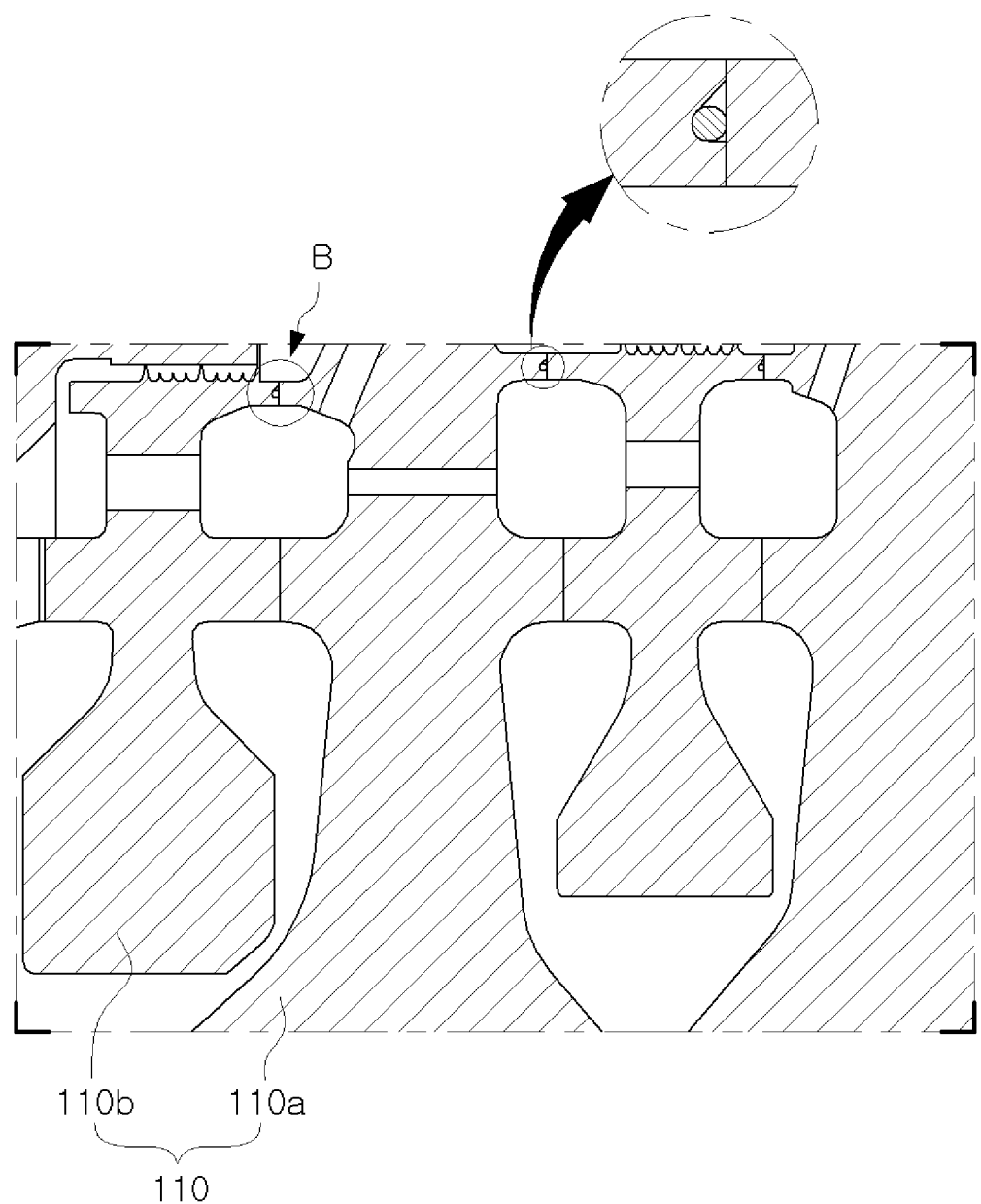
FIG. 2 is an enlarged view illustrating a section A of FIG. 1.

FIG. 2 is an enlarged view illustrating a section A of FIG. 1. Referring to FIG. 2, the turbine disk 110 includes a main disk part 110*a* and an inter-stage disk part 110*b*. The turbine blades 120 are coupled around an outer circumferential surface of the main disk part 110*a*. The main disk part 110*a* is formed in a disk shape. In addition, the turbine blades 120 arranged in the multi-stage are arranged so as to be spaced apart from each other along a circumferential direction of the main disk part 110*a* based on the same stage.

The inter-stage disk part 110*b* is disposed between adjacent main disk parts 110*a*. In addition, the inter-stage disk part 110*b* serves to transmit rotary force generated when the main disk part 110*a* is rotated by the combustion gas passing through the turbine blades 120 to another adjacent main disk part 110*a*. The inter-stage disk part 110*b* is also formed in a disk shape. The turbine vanes 13 are disposed on a radially outer side of the inter-stage disk part 110*b*. The main disk part 110*a* and the inter-stage disk part 110*b* rotate in the circumferential direction with respect to the tie rod 4 passing through the central portion thereof. However, this means that a virtual rotary axis of the main disk part 110*a* and the inter-stage disk part 110*b* coincides with the axial direction (or a longitudinal direction) of the tie rod 4, but does not mean that the main disk part 110*a* and the inter-stage disk part 110*b* are fastened to the outer circumferential surface of the tie rod 4 so that they rotate together with the tie rod 4.

On the other hand, unlike the compressor blades, the turbine blades 120 are in direct contact with the high-temperature and high-pressure combustion gas. Because the temperature of the combustion gas is high enough to reach 1700° C., a cooler is required. To this end, an extraction flow path for extracting and supplying the compressed air to the turbine blades 120 is provided between the compressor 2 and the turbine 10.

The extraction flow path may extend around the compressor casing (i.e., an external flow path), may extend through the interior of the compressor disk (i.e., an internal flow path), or may use both the external and internal flow paths. The compressed air supplied to the inside of the turbine disk 110 through the extraction flow path flows outward in the radial direction, and is supplied to the inside of the turbine blades 120 to cool the turbine blades 120. At this time, the compressed air is present inside the turbine disk 110 and the combustion gas is present outside the turbine disk 110. Therefore, in order to seal a space between the adjacent turbine disks 110, the gas turbine 1 further includes a sealing assembly 1000 and a fastening section 1300.

Figure 3:
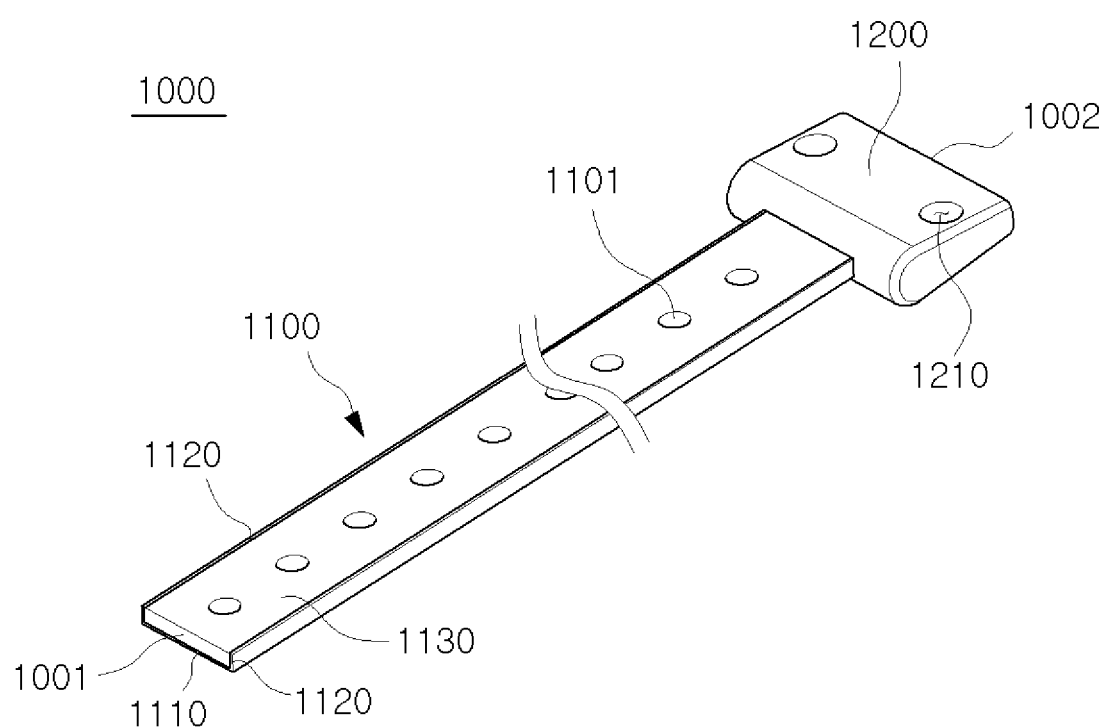
FIG. 3 is a perspective view illustrating a sealing assembly disposed between a pair of turbine disks of FIG. 2.
Figure 4:
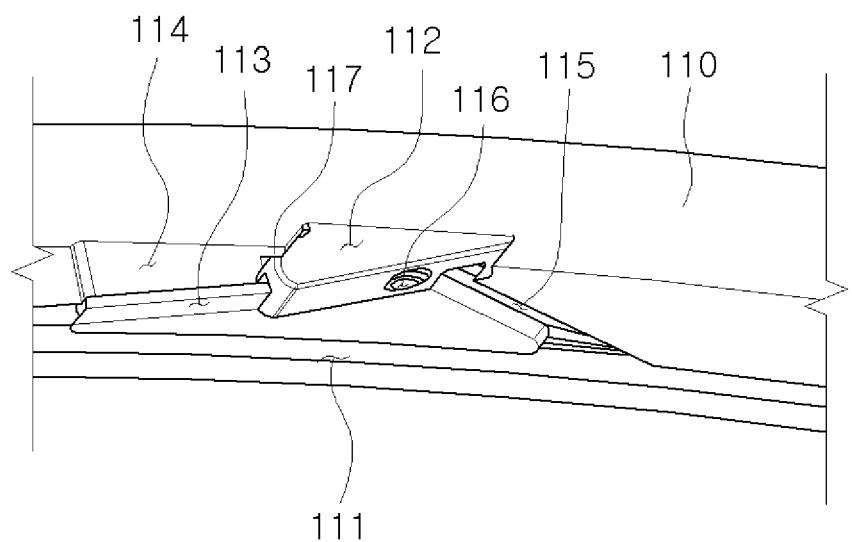
FIG. 4 is an enlarged view of a section B of FIG. 2, illustrating an outer portion of an opposite surface of one of the pair of turbine disks.
Figure 5:
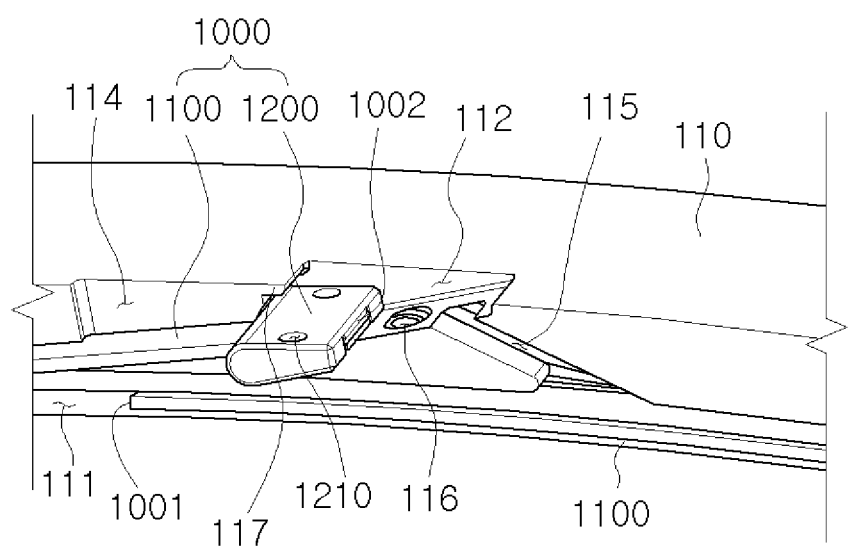
FIG. 5 is a view illustrating a state in which the sealing assembly is inserted into a sealing groove of the turbine disk in the state of FIG. 4.
Figure 6:
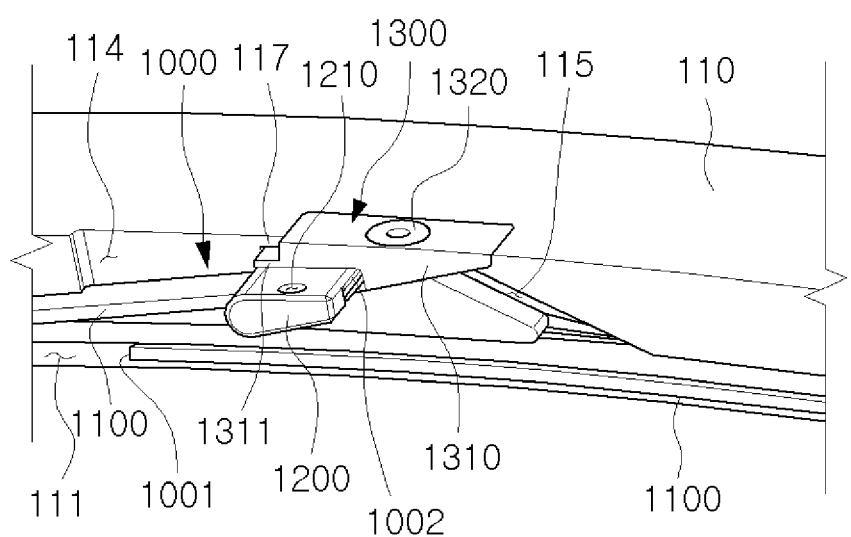
FIG. 6 is a view illustrating a state in which a fastener is installed on the other end of the sealing assembly in the state of FIG. 5.
Figure 7:
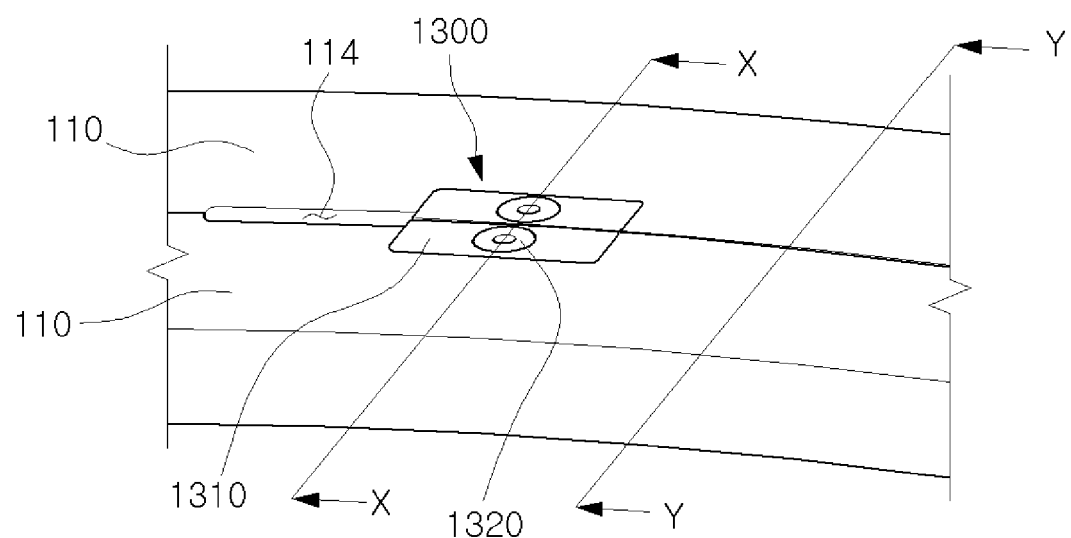
FIG. 7 is a view illustrating another turbine disk installed on the turbine disk of FIG. 6.
Figure 8:
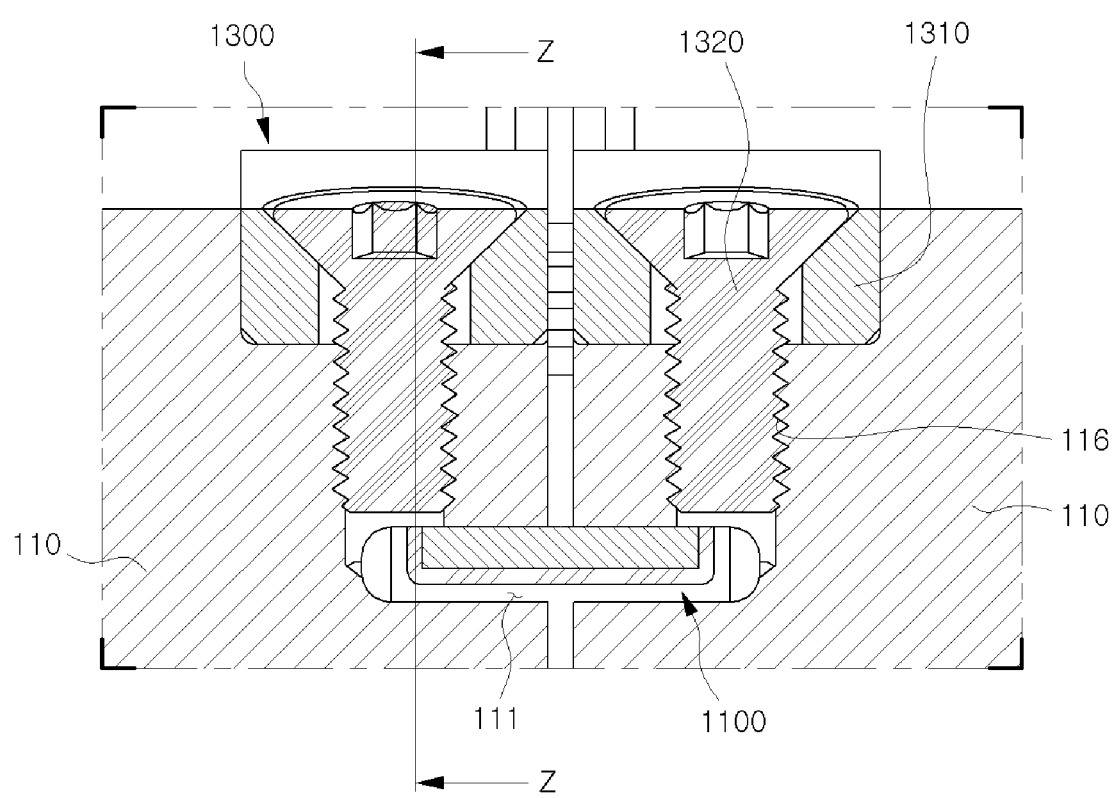
FIG. 8 is a cross-sectional view illustrating a state in which a pair of turbine disks are cut along line X-X in the state of FIG. 7.
Figure 9:
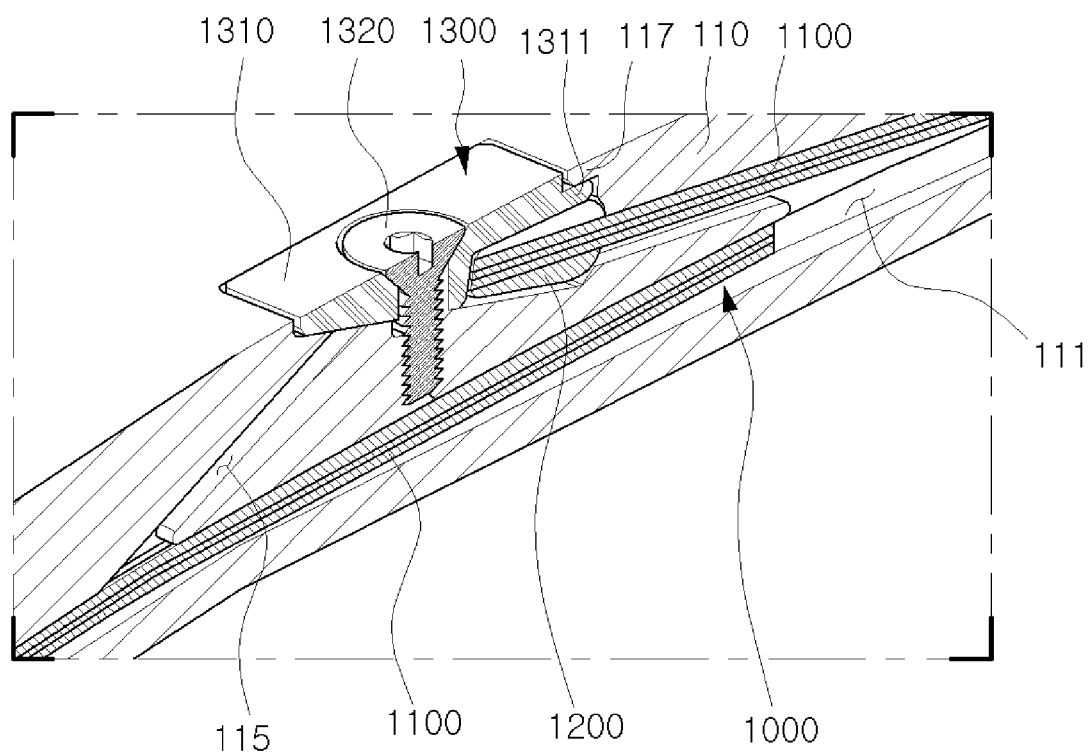
FIG. 9 is a view taken along line Z-Z in FIG. 8.
Figure 10:
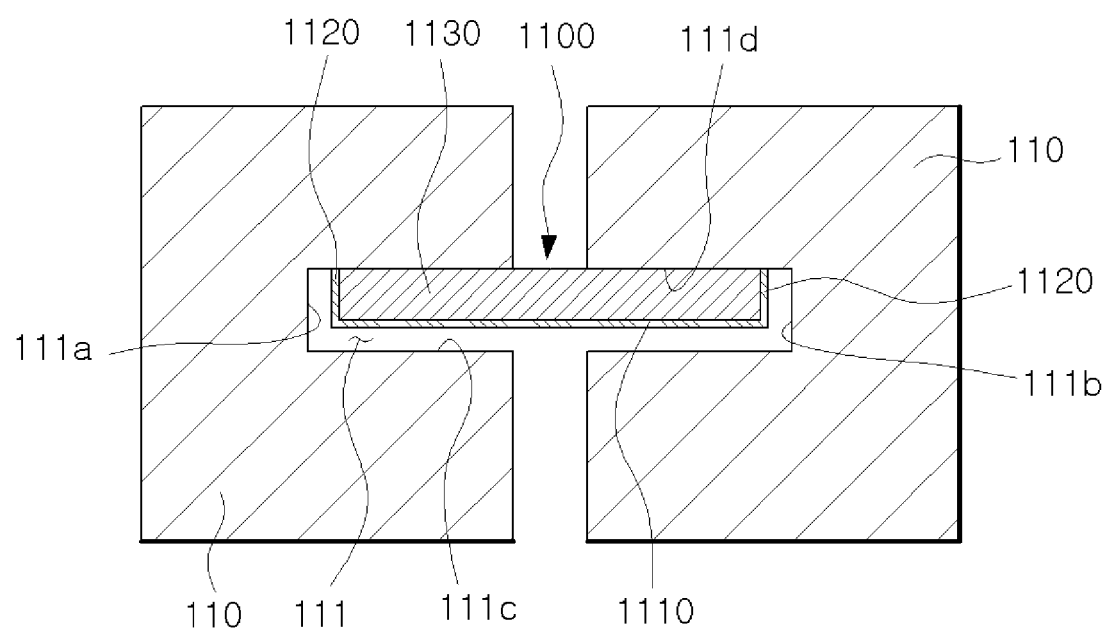
FIG. 10 is a cross-sectional view illustrating a state in which a pair of turbine disks are cut along line Y-Y in the state of FIG. 7.

FIG. 3 is a perspective view illustrating a sealing assembly disposed between a pair of turbine disks of FIG. 2, FIG. 4 is an enlarged view of a section B of FIG. 2, FIG. 5 is a view illustrating a state in which the sealing assembly is inserted into a sealing groove of the turbine disk, FIG. 6 is a view illustrating a state in which a fastener is installed on the other end of the sealing assembly in the state of FIG. 5, FIG. 7 is a view illustrating another turbine disk installed on the turbine disk of FIG. 6, FIG. 8 is a cross-sectional view illustrating a state in which a pair of turbine disks are cut along line X-X in the state of FIG. 7, FIG. 9 is a view taken along line Z-Z in FIG. 8, and FIG. 10 is a cross-sectional view illustrating a state in which a pair of turbine disks are cut along line Y-Y in the state of FIG. 7. Here, based on a flow direction of combustion gas, the upstream side is defined as a front side and the downstream side is defined as a rear side. Meanwhile, the front-rear direction defined herein may be a lateral direction (i.e., a left-right direction) with respect to the circumferential direction of the turbine disk 110. Further, based on the radial direction of the turbine disk 110, a side away from the turbine disk 110 is defined as an outer side, and a side closer to the turbine disk 110 is defined as an inner side. On the other hand, a pair of turbine disks 110 will be referred to as one main disk part 110*a* and one inter-stage disk part 110*b* that are adjacent together.

Referring to FIGS. 3 to 10, the turbine rotor 100 of the gas turbine 1 according to a first exemplary embodiment further includes a sealing assembly 1000 and fastening section 1300. The sealing assembly 1000 is interposed between the pair of turbine disks 110 and is disposed to be circumferentially wound around the turbine disk 110. In FIG. 2, because the compressed air is supplied from the compressor 2 to the inside of the turbine disk 110, the inside of the turbine disk 110 has a higher pressure than the outside of the turbine disk 110. Therefore, in order to prevent the compressed air from leaking from the inside of the turbine disk 110 to the outside, the sealing assembly 1000 is installed between the pair of turbine disks 110. The fastening section 1300 is installed on the sealing assembly 1000 to fasten the sealing assembly 1000 to the pair of turbine disks 110.

Referring to FIGS. 3 and 4, the sealing assembly 1000 includes a main body 1100 and a sealing head 1200. The main body 1100 is formed in a strip shape such that one end 1001 is inserted into a sealing slot 111 through a head slot 112 of the turbine disk 110. In addition, the main body 1100 is disposed between the pair of turbine disks 110 in a ring shape while being wound along the path of the sealing slot 111. Accordingly, the main body 1100 spatially separates the outer and inner sides based on the main body 1100, and seals the space between the pair of turbine disks 110 as well.

Referring to FIGS. 3 and 10, the main body 1100 includes a sealing plate 1110, a pair of sealing edges 1120, and a buffer plate 1130. The sealing plate 1110 is formed in a long strip shape with a thin thickness. The pair of sealing edges 1120 are formed to face outward from a front and a rear end sides of the sealing plate 1110. FIG. 10 illustrates a cross-section of the disk 110 when the disk 110 is cut in a plane including a virtual axis of the turbine disk 110, wherein the pair of sealing edges 1120 are formed to face outward from opposite sides (i.e., left and right sides) of the sealing plate 1100 with reference to the circumferential direction of the turbine disk 110.

Because the inside of the pair of turbine disks 110 (i.e., a lower side of the pair of turbine disks 110 in FIG. 10) has a higher pressure than the outside of the pair of turbine disks 110 (i.e., an upper side of the pair of turbine disks 110 in FIG. 10), the main body 1100 is forced outward by compressed air introduced into a gap between the pair of turbine disks 110. In addition, because the pair of turbine disks 110 rotate during operation of the gas turbine 1, the main body 1100 receives centrifugal force to the outside. Therefore, if the pair of sealing edges 1120 are formed to face outward rather than inward from the sealing plate 1110, as the main body 1100 is pressed outward, outer ends of the pair of sealing edges 1120 can be more firmly in close contact with the outer portion of an inner wall of the sealing slot 111. In addition, in this case, choking occurs between outer ends of the pair of sealing edges 1120 and an outer portion of an inner wall of the sealing slot 111 to prevent compressed air from escaping therebetween. Therefore, as the pair of sealing edges 1120 are formed to face outward, the main body 1100 may seal the space between the pair of turbine disks 110 more effectively. On the other hand, the sealing slot 111 may have a rectangular cross section. That is, the inner wall of the sealing slot 111 may be formed such that a front portion 111a and a rear portion 111b are perpendicular to an inner portion 111c and an outer portion 111d, respectively.

The buffer plate 1130 seated on an outside of the sealing plate 1110 is disposed between the pair of sealing edges 1120. In addition, the buffer plate 1130 is disposed such that a front end and a rear end are brought into contact with the pair of sealing edges 1120, respectively. The buffer plate 1130 may be formed from a woven fabric material with a warp including a silk or cotton yarn and a weft including a gold or silver yarn. The buffer plate 1130 is installed on the sealing plate 1110 to improve an elasticity and a flexibility of the main body 1100, thereby dampening vibrations or shocks that may occur during rotation of the turbine disk 110. Therefore, the gas turbine 1 according to the exemplary embodiment is designed such that the main body 1100 is provided with the buffer plate 1130 disposed on the sealing plate 1110, thereby improving a responsiveness (i.e., a compliance) of the sealing assembly 1000 according to the operation of the turbine rotor 100 so that the sealing performance of the sealing assembly 1000 can be improved accordingly.

The sealing plate 1110 and the buffer plate 1130 are coupled to each other through a plurality of welds 1101. It is understood that although the plurality of welds 1101 are being circular in FIG. 3, but this is only an example, and the plurality of welds 1101 may be arranged in a line pattern in which lines arranged in parallel with each other, or lines are staggered with each other.

The sealing head 1200 is provided such that one end thereof is installed on the other end of the main body 1100. If one end of the main body 1100 is inserted into the sealing slot 111 through the head slot 112, the sealing head 1200 is seated on an inner wall of the head slot 112 to stop a movement of the main body 1100. That is, after the main body 1100 is inserted into the sealing slot 111, the sealing head 1200 allows the main body 1100 to remain fixed in the sealing slot 111 without being moved further along the path of the sealing slot 111. Here, one end 1001 of the sealing assembly 1000 may be one end of the main body 1100, and the other end 1002 of the sealing assembly 1000 may be the other end of the sealing head 1200. In addition, the other end of the main body 1100 may be a portion to which one end of the sealing head 1200 is coupled.

The sealing head 1200 is provided with an auxiliary operation hole 1210. After installed between the pair of turbine disks 110, the sealing assembly 1000 can be more easily taken out of the turbine disks 110 by inserting a separate tool into the auxiliary operation hole 1210 and pulling out the separate tool so that the sealing head 1200 is pulled out.

On the other hand, the sealing head 1200 is provided such that a width thereof in the forth-rear direction is formed larger than a width of the main body 1100. In addition, as illustrated in FIG. 4, the head slot 112 is provided such that a width thereof in the front-rear direction is formed larger than a width of the sealing slot 111 and a connection slot 113. Thus, when one end 1001 of the sealing assembly 1000 is inserted into the sealing slot 111, the sealing head 1200 is seated on the inner wall of the head slot 112 so that the main body 1100 is restricted from being moved.

Referring to FIG. 4, each of the pair of turbine disks 110 is provided with a sealing slot 111, a head slot 112, a connection slot 113, an insertion groove 114, an outlet groove 115, a bolt hole 116, and an anti-release step 117 on opposite surfaces facing each other. The sealing slot 111 is formed in a ring shape extending along the circumferential direction of the turbine disk 110. Although FIG. 4 illustrates a portion of the turbine disk 110, as the portion of the sealing slot 111 extends along the forming direction thereof, it forms a ring shape as a whole. The head slot 112 is formed on the outside of the sealing slot 111 such that the head slot 112 opens toward the outside of the turbine disk 110. Only a single head slot 112 or multiple head slots 112 may be formed on one turbine disk 110.

The connection slot 113 is formed to extend in an oblique direction outward from the sealing slot 111. In addition, the connection slot 113 is connected to the head slot 112 so that the sealing slot 111 and the head slot 112 communicate with each other. The sealing assembly 1000 is disposed between the pair of turbine disks 110 such that one end thereof is inserted sequentially into the head slot 112, the connection slot 113, and the sealing slot 111 from the outside of the turbine disk 110.

The head slot 112 is provided such that a width thereof in the front-rear direction is formed to be larger than a width of the connection slot 113. In this case, as illustrated in FIG. 5, the sealing head 1200 is seated on the inner wall of the head slot 112 on the connection slot 113 side. Accordingly, the sealing head 1200 restricts the main body 1100 from moving on the sealing slot 111.

If the sealing assembly 1000 is to be installed between the pair of turbine disks 110, one end of the sealing assembly 1000 is inserted into the sealing slot 111 through the head slot 112, and if the sealing assembly 1000 is to be separated from the pair of turbine disks 110, the other end of the sealing assembly 1000 is pulled outward. Through this process, the sealing assembly 1000 may be replaced. Therefore, according to the turbine rotor 100, the turbine 10, and the gas turbine 1 including the same, the sealing assembly 1000 can be easily separated from the turbine disks 110 for replacement of the sealing assembly 1000 without disassembling the pair of turbine disks 110.

Referring to FIGS. 4 and 7, the insertion groove 114 formed on the outside of the connection slot 113 is formed to be open outward from the turbine disks 110. Therefore, even when the opposing surfaces of the pair of turbine disks 110 are in contact with each other, a separate tool can be inserted into the inner side of the pair of turbine disks 110 through the insertion groove 114 from the outside of the turbine disks 110. The outlet groove 115 formed on an opposite side of the connecting slot 113 with respect to the head slot 112 is formed to face in a direction that is inclined outwardly from the connection slot 113, but in a direction opposite to the formation direction of the connection slot 113. In addition, the outlet groove 115 is connected to the head slot 112 so that the head slot 112 and the sealing slot 111 communicate with each other on the opposite side to the connection slot 113.

In a case in which a portion of the main body 1100 is damaged during the operation of the gas turbine 1, even after the sealing head 1200 is taken out so that the sealing assembly 1000 is pulled out, there may be cases in which some of the damaged parts are left in the sealing slot 111. In order to pull out a portion of the damaged part to the outside, the insertion groove 114 and the outlet groove 115 are formed in the turbine disk 110. An operator may insert a separate tool through the insertion groove 114 and press a portion of the damaged part remaining on the sealing slot 111 using the separate tool. In this case, a portion of the damaged part is exposed to the head slot 112 through the outlet groove 115 while moving along the sealing slot 111. Accordingly, the operator can completely remove the sealing assembly 1000 from the turbine disk 110 by pulling out the portion of the damaged part that has escaped through the outlet groove 115.

Referring to FIGS. 4 to 9, the bolt hole 116 is formed on the inner wall of the head slot 112 on the sealing slot 111 side along the radial direction of the turbine disk 110. Here, the sealing head 1200 is disposed between the connection slot 113 and the bolt hole 116. The anti-release step 117 is formed to protrude from the outside of the inner wall of the head slot 112 on the connection slot 113. The fastening section 1300 is inserted into the head slot 112 to press the sealing head 1200 from the outside of the turbine disk 110. The fastening section 1300 fastens the sealing head 1200 to the turbine disk 110 so that the sealing assembly 1000 is prevented from deviating outward from the pair of turbine disks 110 during the operation of the gas turbine 1.

To this end, the fastening section 1300 includes a fastening cap 1310, a fastening step 1311, and a fastening bolt 1320. The fastening cap 1310 is inserted into the head slot 112 from the outside of the turbine disk 110 and presses the sealing head 1200 inward. The fastening step 1311 protrudes from the surface on the connecting slot 113 side toward the connecting slot 113 side. In addition, the fastening step 1311 is disposed between the anti-release step 117 and the sealing head 1200. Accordingly, the fastening step 1311 secures the sealing head 1200 to the turbine disk 110 more firmly, and comes into contact with an inside of the anti-release step 117 so that the fastening cap 1310 is prevented from escaping outward. The fastening bolt 1320 penetrates through the fastening cap 1310 from the outside of the fastening cap 1310 and into the bolt hole 116. Accordingly, the fastening bolt 1320 secures the fastening cap 1310 to the turbine disk 110.

Here, because the sealing head 1200 is disposed between the connection slot 113 and the bolt hole 116, the fastening bolt 1320 does not penetrate through the sealing head 1200. Thus, the sealing head 1200 is prevented from being fastened to the turbine disk 110 through direct penetration of the fastening bolt 1320 therethrough, thereby fundamentally block an occurrence of stress concentration and defects in the fastening portion, which occur due to direct penetration of the fastening bolt 1320 through the sealing head 1200.

Referring to FIGS. 5 to 7, a process of installing the sealing assembly 1000 and the fastening section 1300 between the pair of turbine disks 110 will be described. First, one end of the sealing assembly 1000 is inserted into the head slot 112 and then into the sealing slot 111 through the connection slot 113. In this case, the main body 1100 is bent in a ring shape between the pair of turbine disks 110 along the path of the sealing slot 111, that is, along the circumferential direction of the turbine disk 110. The sealing assembly 1000 is inserted until the sealing head 1200 is seated on the inner wall of the head slot 112, and then the fastening cap 1310 is seated on the outside of the sealing head 1200. Then, the fastening bolt 1320 is inserted into the bolt hole 116 through the fastening cap 1310 to fasten the fastening cap 1310 to the turbine disk 110. Through this process, the sealing assembly 1000 is installed between the pair of turbine disks 110 to seal the gap therebetween.

The process of separating the sealing assembly 1000 from the pair of turbine disks 110 may be performed in reverse of the above described process. That is, after the fastening bolt 1320 is unscrewed and released, the fastening cap 1310 is separated from the sealing head 1200. Then, a separate tool is inserted into the auxiliary operation hole 1210 of the sealing head 1200 and is pulled out so that the sealing head 1200 is pulled outward. In this case, the main body 1100 is pulled outward from the disk 110 together with the sealing head 1200 so that the sealing assembly 1000 is completely separated from the turbine disk 110. On the other hand, in the process of pulling out the sealing assembly 1000, when the damaged portion of the main body 1100 remains as pieces on the sealing slot 111, a separate tool is inserted into the insertion groove 114 to push out the pieces remaining on the sealing slot 111 so that the pieces can be discharged outward from the turbine disks 110 through the outlet groove 115.

As described above, the sealing assembly 1000 can be replaced by simply inserting the sealing assembly 1000 between the pair of turbine disks 110, or pulling the sealing assembly 1000 out of the pair of turbine disks 110. Thus, according to the turbine rotor 100, the turbine 10, and the gas turbine 1, the sealing assembly 1000 can be more easily separated and replaced with respect to the pair of turbine disks 110 without disassembling the pair of turbine disks 110.

Figure 11:
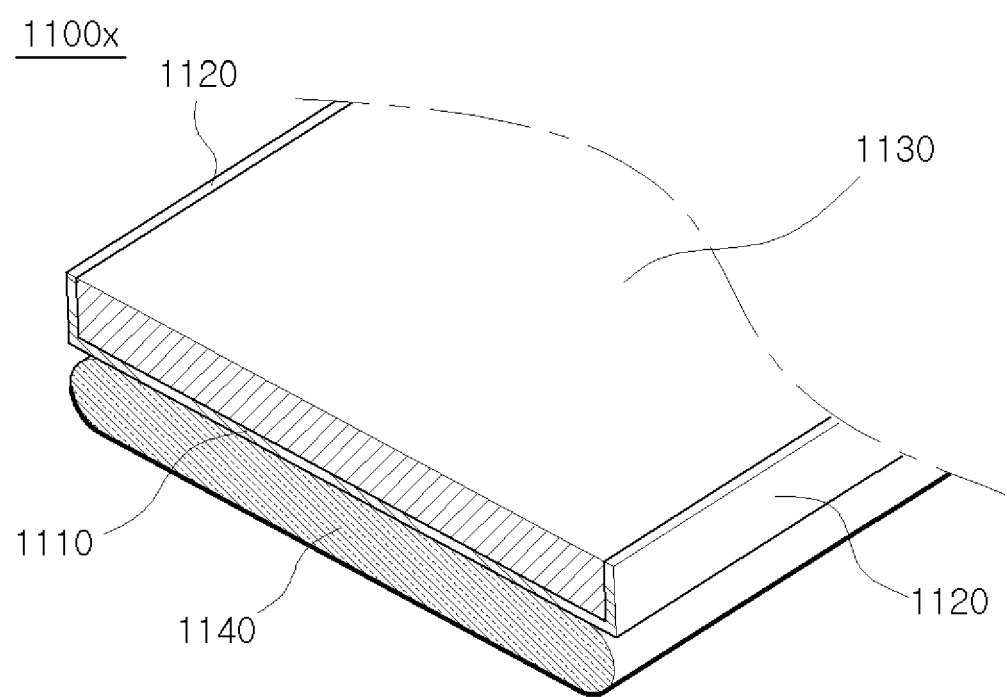
FIG. 11 is a perspective view illustrating a main body of a gas turbine according to a second exemplary embodiment.
Figure 12:
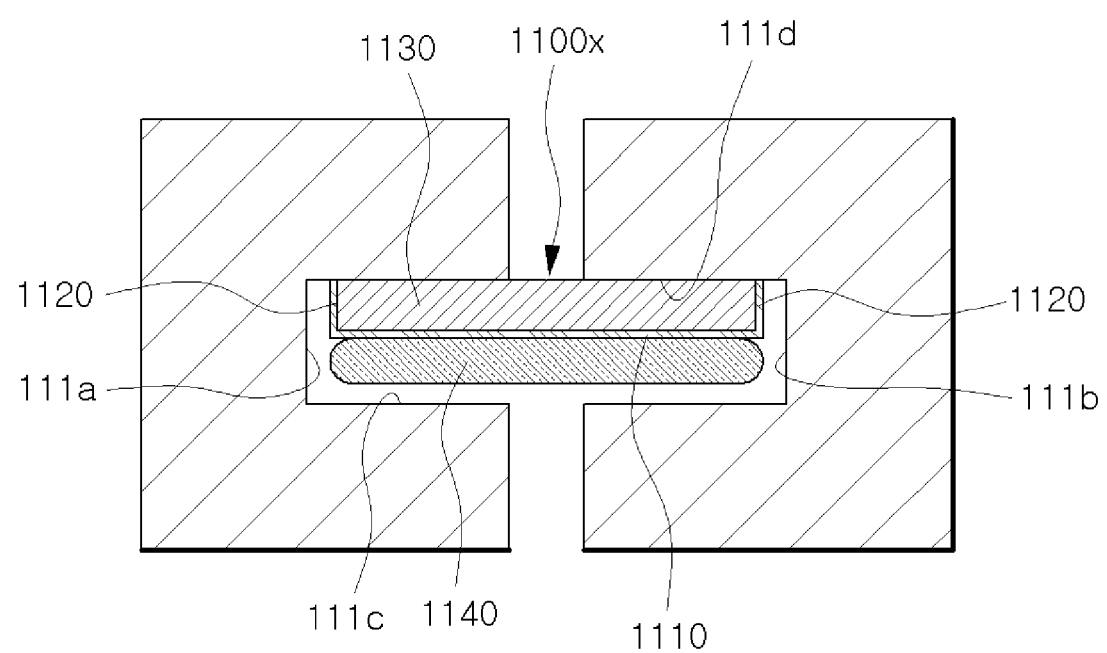
FIG. 12 is a cross-sectional view illustrating a state in which the main body of FIG. 11 is inserted into the sealing groove of FIG. 10.

FIG. 11 is a perspective view illustrating a main body of a gas turbine according to a second exemplary embodiment, and FIG. 12 is a cross-sectional view illustrating a state in which the main body of FIG. 11 is inserted into the sealing groove of FIG. 10. Here, a description of configurations overlapping with the first exemplary embodiment will be omitted. For example, components having unchanged shape or structure in comparison with the first exemplary embodiment use same reference numerals, and components having changed shape or structure in comparison with the first exemplary embodiment use reference numerals in which alphabets x, y, and z are sequentially added to the end of the reference numerals as a suffix.

Referring to FIGS. 11 and 12, a main body 1100x according to a second exemplary embodiment further includes an auxiliary plate 1140. The auxiliary plate 1140 disposed inward from the sealing plate 1110 is provided such that a front and a rear side ends thereof have convexly curved shapes, respectively. In this case, the auxiliary plate 1140 may be formed from a woven fabric material with a warp including a silk or cotton yarn and a weft including a gold or silver yarn. Thus, the auxiliary plate 1140, together with the buffer plate 1130, improves an overall elasticity and flexibility of the main body 1100 and dampens vibrations, shocks, etc. occurring during a rotation of the turbine rotor 100. Accordingly, the auxiliary plate 1140 seals the gap between the pair of turbine disks 110 more effectively. Meanwhile, the auxiliary plate 1140 prevents excessive heat transfer from the compressed air supplied to the inside of the pair of turbine disks 110 to the sealing plate 1110.

Figure 13:
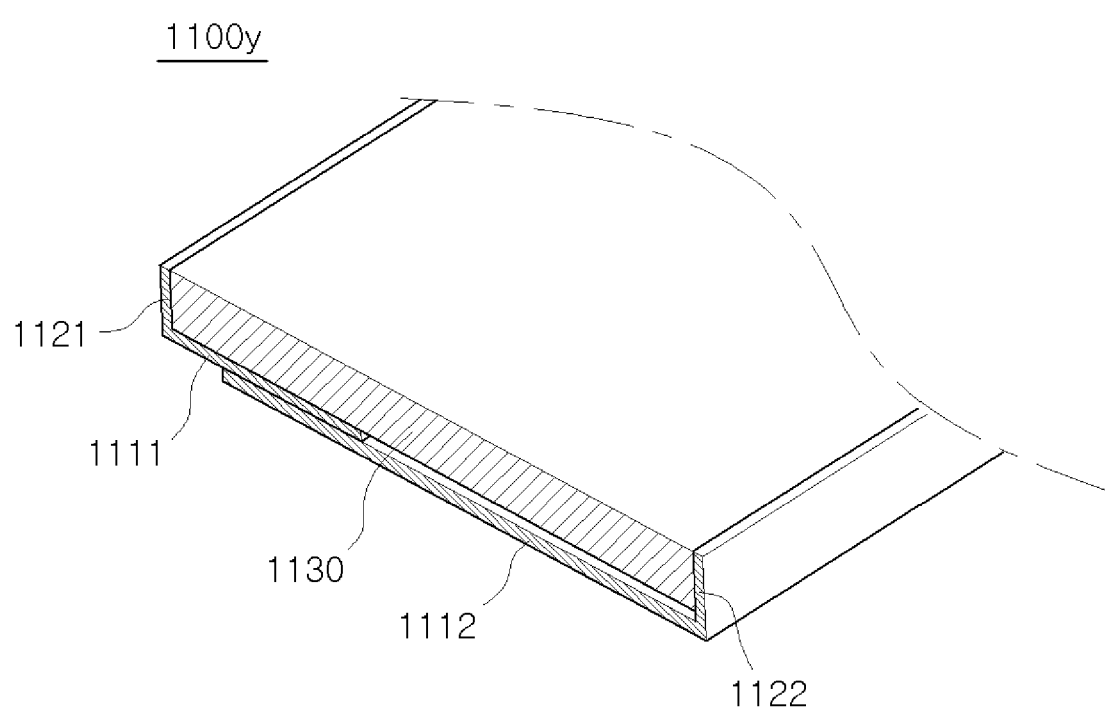
FIG. 13 is a perspective view illustrating a main body of a gas turbine according to a third exemplary embodiment.
Figure 14:
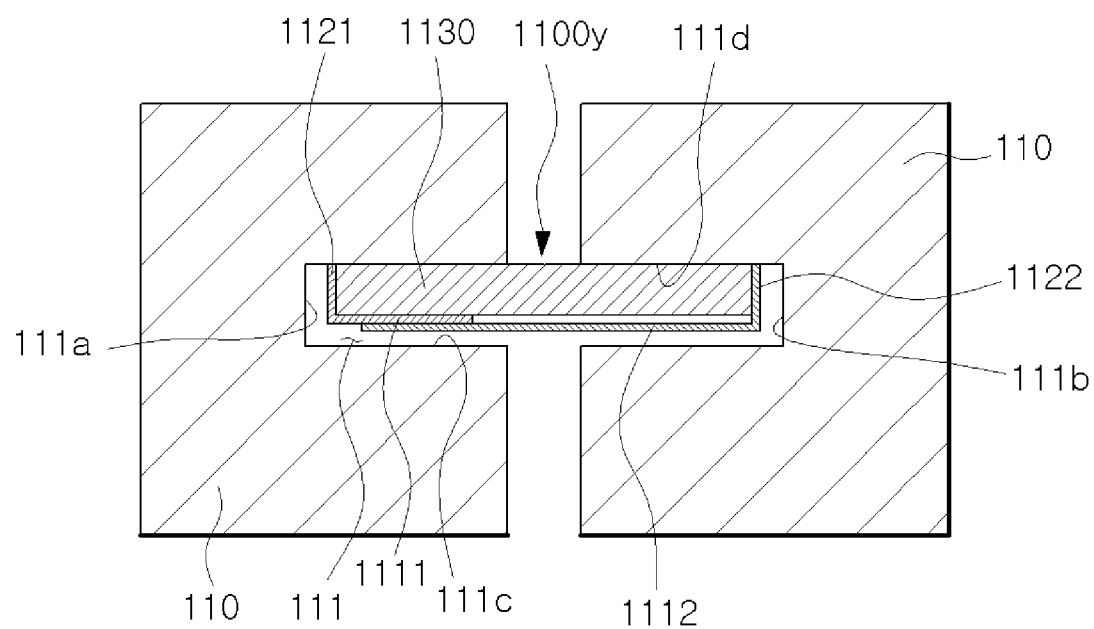
FIG. 14 is a cross-sectional view illustrating a state in which the main body of FIG. 13 is inserted into the sealing groove of FIG. 10.

FIG. 13 is a perspective view illustrating a main body of a gas turbine according to a third exemplary embodiment, and FIG. 14 is a cross-sectional view illustrating a state in which the main body of FIG. 13 is inserted into the sealing groove of FIG. 10. Referring to FIGS. 13 and 14, a main body 1100y includes a first sealing plate 1111, a second sealing plate 1112, a first sealing edge 1121, and a second sealing edge 1122. The first sealing edge 1121 and the second sealing edge 1122 are disposed in contact with the front and rear side ends of the buffer plate 1130, respectively. Here, the first sealing edge 1121 and the second sealing edge 1122 may be arranged to change positions from each other.

The first sealing plate 1111 is formed to face the second sealing edge 1122 from an inner end of the first sealing edge 1121. The second sealing plate 1112 is formed to face the first sealing edge 1121 from an inner end of the second sealing edge 1122. Here, the first sealing plate 1111 is formed such that a width thereof in the front-rear direction is smaller than a width of the buffer plate 1130. In addition, the second sealing plate 1112 is formed such that a width thereof in the front-rear direction is smaller than the width of the buffer plate 1130 and an outer surface thereof is in contact with an inner surface of the first sealing plate 1111. Thus, a gap is formed between the buffer plate 1130 and the second sealing plate 1112. Meanwhile, the first sealing plate 1111 and the second sealing plate 1112 are respectively welded and coupled to the buffer plate 1130.

Here, the first sealing plate 1111 and the first sealing edge 1121, and the second sealing plate 1112 and the second sealing edge 1122 are each welded to the buffer plate 1130 in a state of having a pre-load. In this case, respective outer ends of the first sealing edge 1121 and the second sealing edge 1122 may be brought into closer contact with an outer portion of an inner wall of the sealing slot 111. Thus, the sealing performance of the sealing assembly 1000y may be improved and vibrations of the sealing assembly 1000y may be dampened, thereby preventing the sealing assembly 1000y and the inner wall of the sealing slot 111 from being worn due to mechanical friction.

Figure 15:
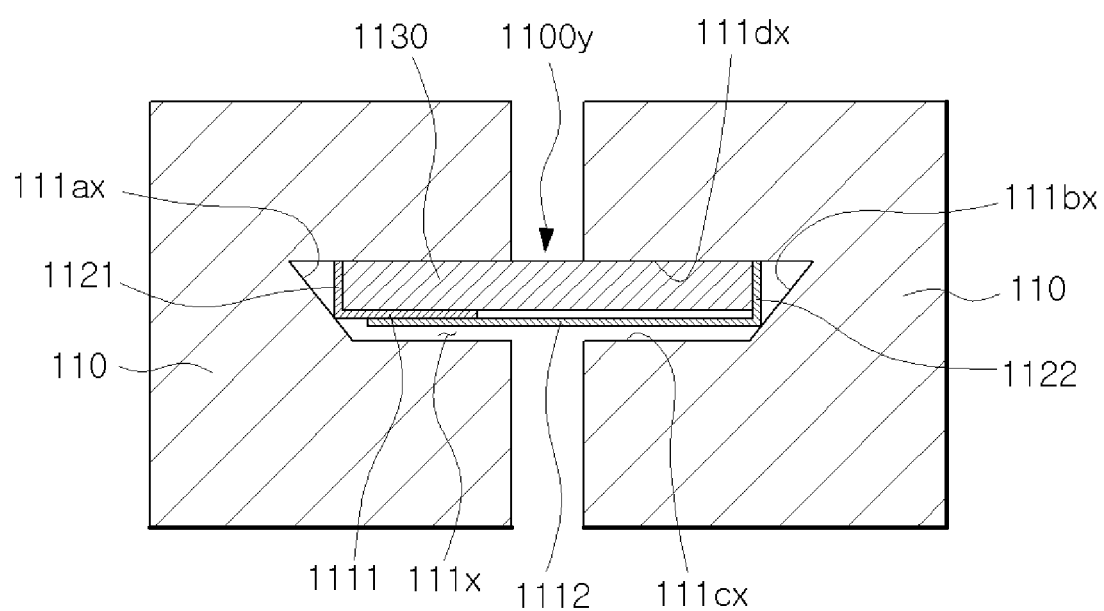
FIG. 15 is a cross-sectional view illustrating a state in which the main body of FIG. 13 is inserted into a sealing groove of a gas turbine according to a fourth exemplary embodiment.

FIG. 15 is a cross-sectional view illustrating a state in which the main body of FIG. 13 is inserted into a sealing groove of a gas turbine according to a fourth exemplary embodiment. Referring to FIG. 15, a sealing slot 111x has a changed cross-sectional shape.

The sealing slot 111x is provided such that a width thereof in the front-rear direction gradually increases from an inside toward an outside. That is, among inner walls of the sealing slot 111x, a front side portion 111ax and a rear side portion 111bx are formed to have an obtuse angle with respect to an inner portion 111cx of the inner walls of the sealing slot 111x and are formed to have an acute angle with respect to an outer portion 111dx of the inner walls of the sealing slot 111x. Here, an angle defined by the first sealing edge 1121 and the first sealing plate 1111 is formed to be smaller than an angle formed by the front side portion 111ax and the inner portion 111cx of the inner walls of the sealing slot 111x. In addition, an angle formed by the second sealing edge 1122 and the second sealing plate 1112 is formed to be smaller than an angle formed by the rear side portion 111bx and the inner portion 111cx of the inner walls of the sealing slot 111x. That is, the angle formed between the first sealing edge 1121 and the first sealing plate 1111 may be 90 degrees, and the angle formed between the second sealing edge 1122 and the second sealing plate 1112 may also be 90 degrees.

When the sealing slot 111x is designed in such a structure, the first sealing edge 1121 has a structure in which the front side thereof does not come into whole contact with the front side inner wall 111ax of the sealing slot 111x, but only a portion connected to the first sealing plate 1111 comes into contact with the front side inner wall 111ax of the sealing slot 111x. In addition, the second sealing edge 1122 has a structure in which the rear side thereof does not come into whole contact with the rear side inner wall 111bx of the sealing slot 111x, but only a portion connected to the second sealing plate 1112 comes into contact with the rear side inner wall 111bx of the sealing slot 111x.

In this case, in addition to the occurrence of choking between the outer ends of the first and second sealing edges 1121 and 1122 and the outer ends 111dx of the sealing slot 111x, choking may also occur at a portion in which the first sealing edge 1121 and the first sealing plate 1111 is connected and at a portion in which the second sealing edge 1122 and the second sealing plate 1112 is connected. Thus, the sealing performance of the sealing slot 111x by the sealing assembly 1000 can be further improved.

Figure 16:
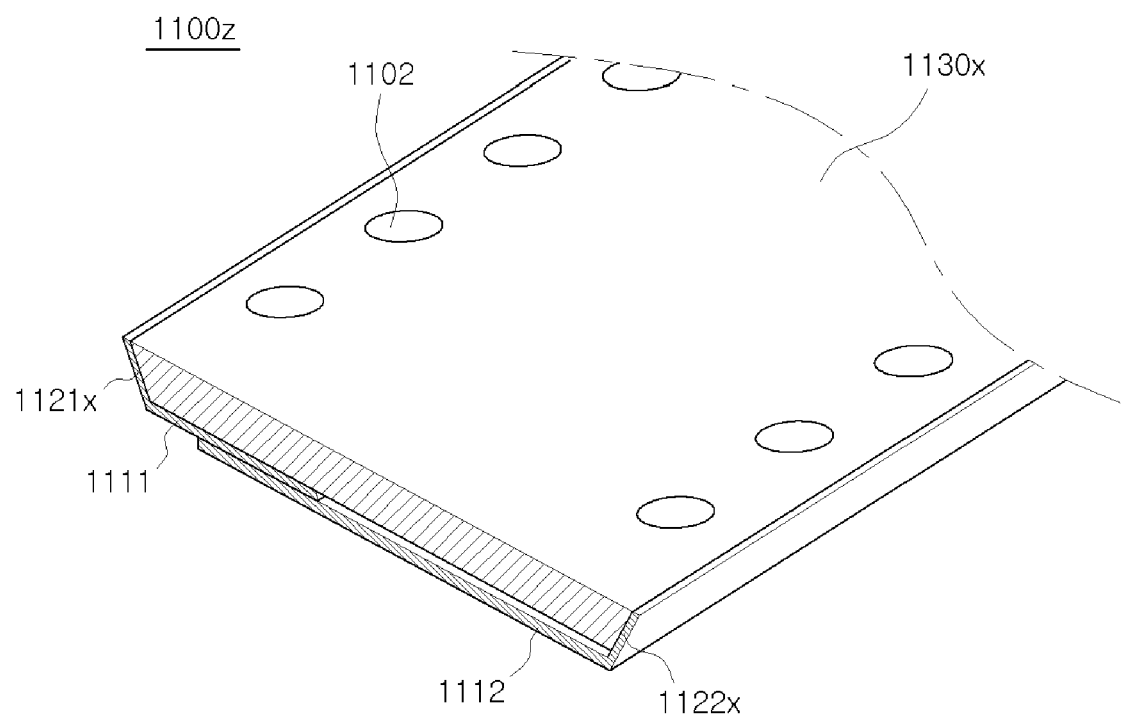
FIG. 16 is a perspective view illustrating a main body according to a fifth exemplary embodiment.
Figure 17:
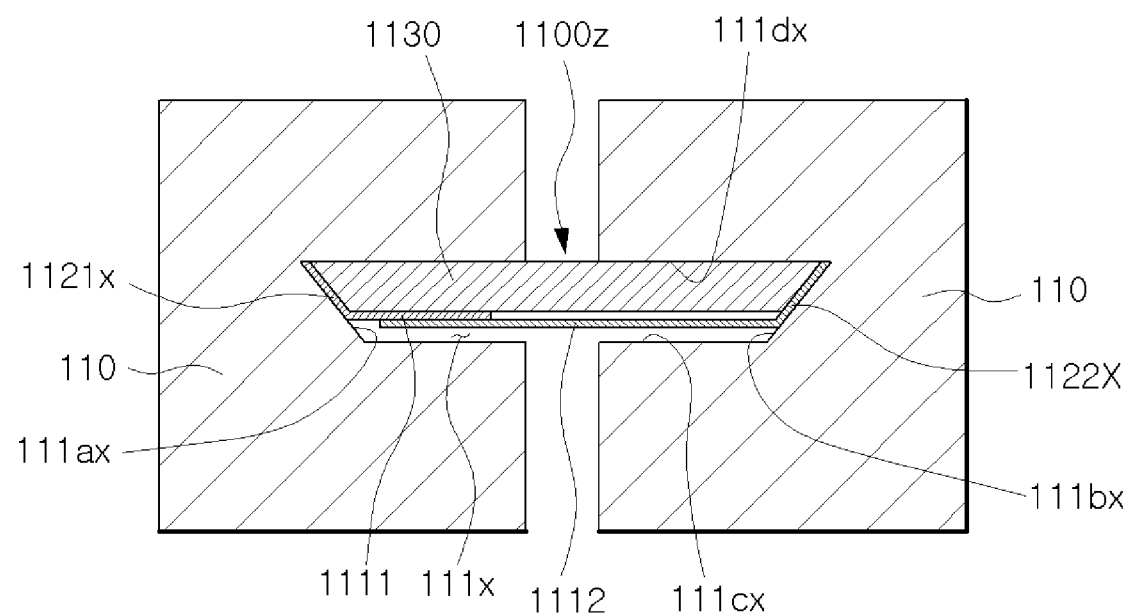
FIG. 17 is a cross-sectional view illustrating a state in which the main body of FIG. 16 is inserted into the sealing groove of FIG. 15.

FIG. 16 is a perspective view illustrating a main body according to a fifth exemplary embodiment, and FIG. 17 is a cross-sectional view illustrating a state in which the main body of FIG. 16 is inserted into the sealing groove of FIG. 15. Referring to FIGS. 16 and 17, a main body 1100z has a changed shape compared to the main body 1100y of FIG. 15.

Referring to FIGS. 16 and 17, an angle formed by a first sealing edge 1121x and the first sealing plate 1111 is designed to have the same angle as an angle formed by the front side portion 111ax and the inner portion 111cx in the inner walls of the sealing slot 111x. Further, an angle formed by a second sealing edge 1122x and the second sealing plate 1112 is designed to have the same angle as an angle formed by the rear side portion 111bx and the inner portion 111cx in the inner walls of the sealing slot 111x. That is, a front side face of the first sealing edge 1121x comes into whole contact with a front side inner wall 111ax of the sealing slot 111x, and a rear side face of the second sealing edge 1122x comes into whole contact with a rear side inner wall 111bx of the sealing slot 111x. In addition, a buffer plate 1130x is formed such that front and rear side ends thereof come into contact with the first sealing edge 1121x and the second sealing edge 1122x, respectively. Meanwhile, the first sealing plate 1111 and the second sealing plate 1112 are welded and coupled to the buffer plate 1130x through welds 1102, respectively.

When the main body 1100z is designed in such a structure, a contact area of the main body 1100z with the inner wall of the sealing slot 111x can be maximized. Thus, according to the fifth exemplary embodiment, the sealing performance of the sealing slot 111x by the sealing assembly 1000 may be further improved.

Figure 18:
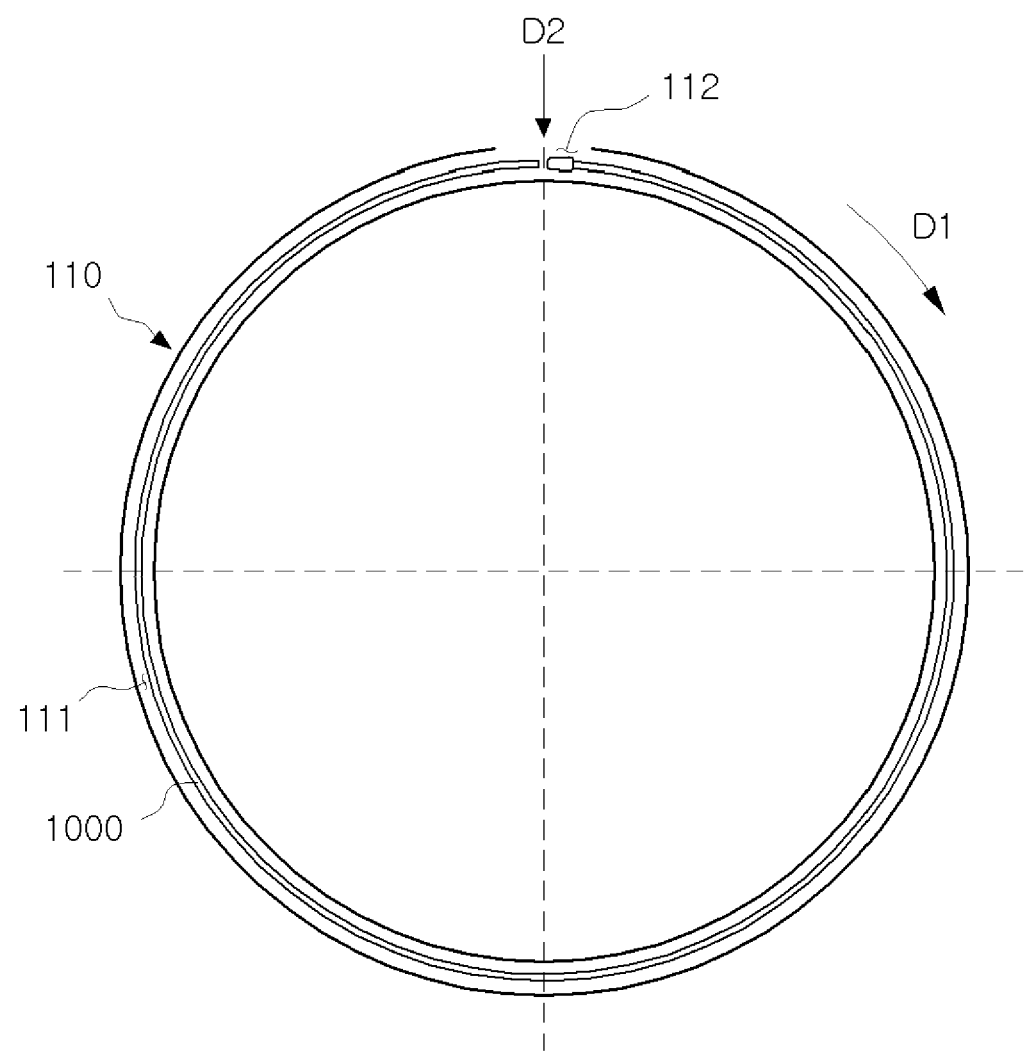
FIG. 18 is a schematic view illustrating a state in which one sealing assembly is inserted into one turbine disk.
Figure 19:
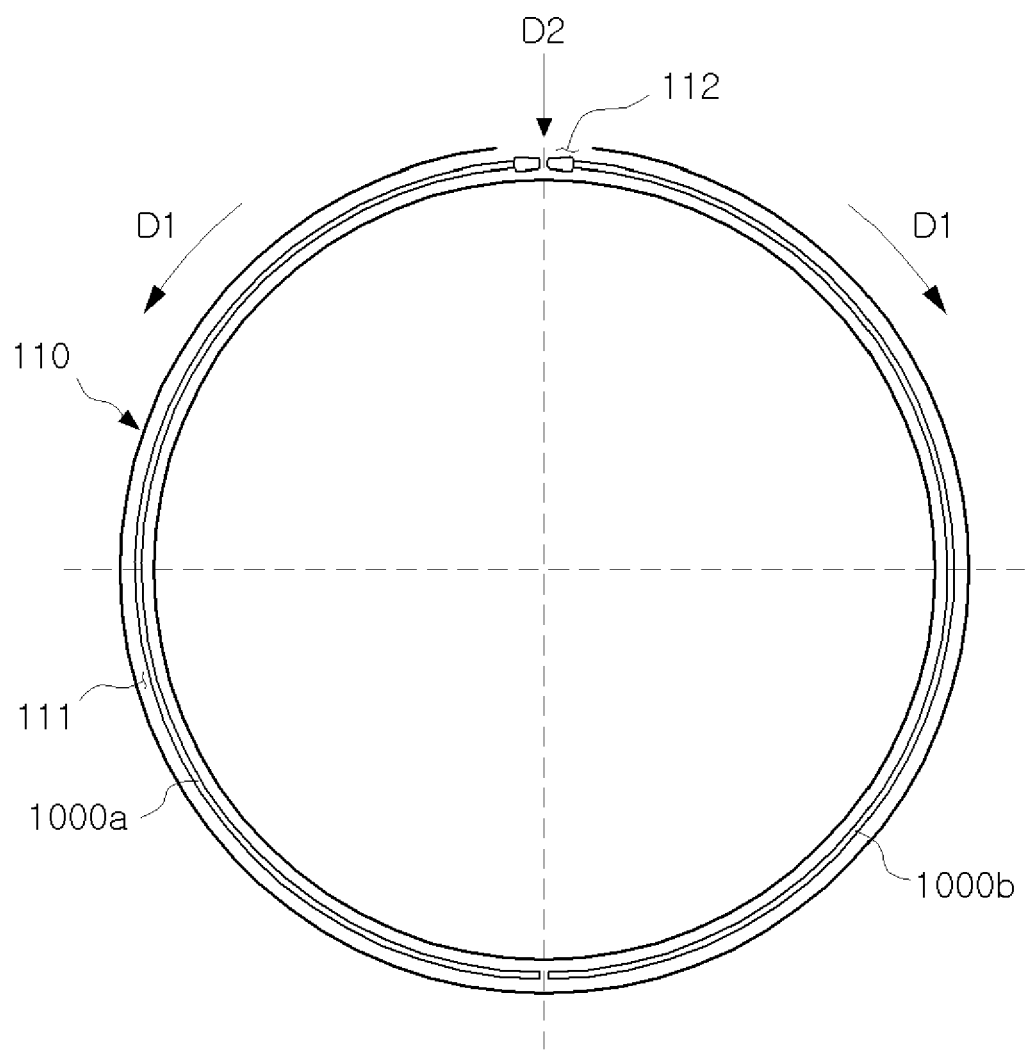
FIG. 19 is a schematic view illustrating a state in which two sealing assemblies are inserted into one turbine disk.
Figure 20:
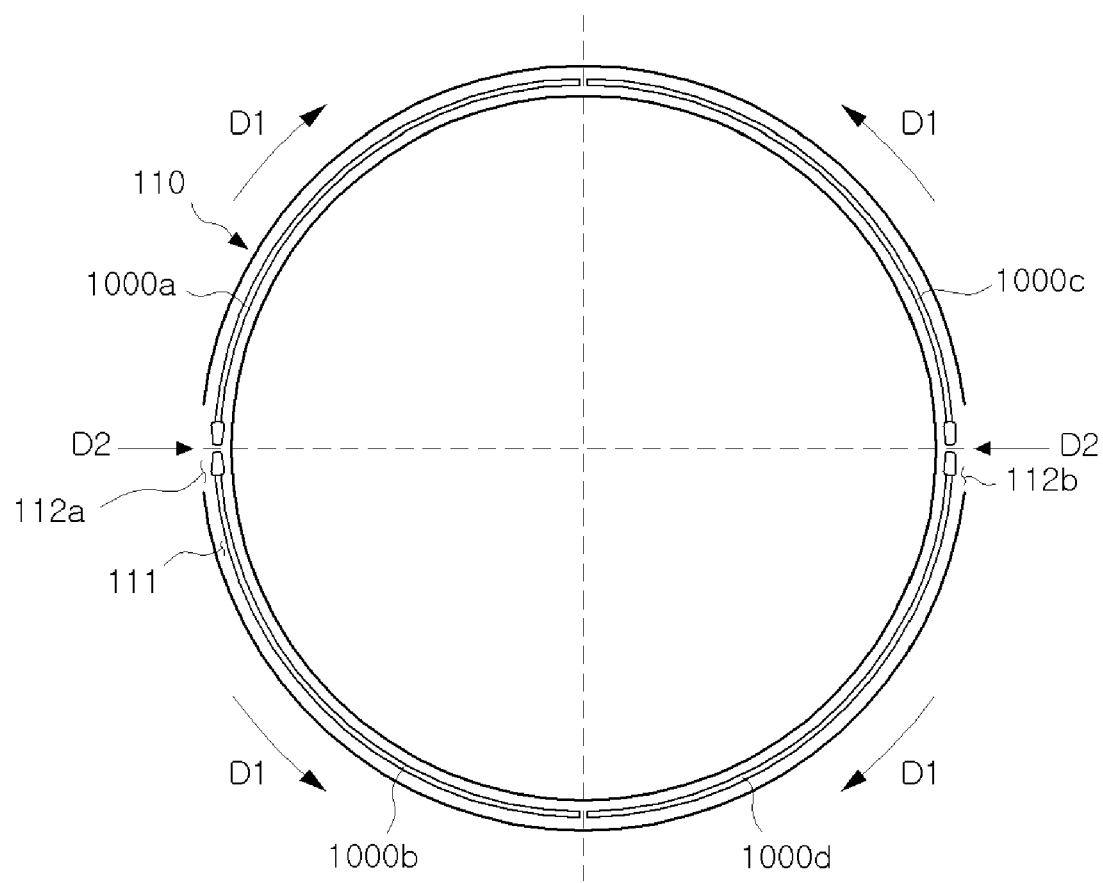
FIG. 20 is a schematic view illustrating a state in which four sealing assemblies are inserted into a turbine disk, and illustrating a state in which one end of one of sealing assemblies is inserted to face one end of another adjacent sealing assembly.
Figure 21:
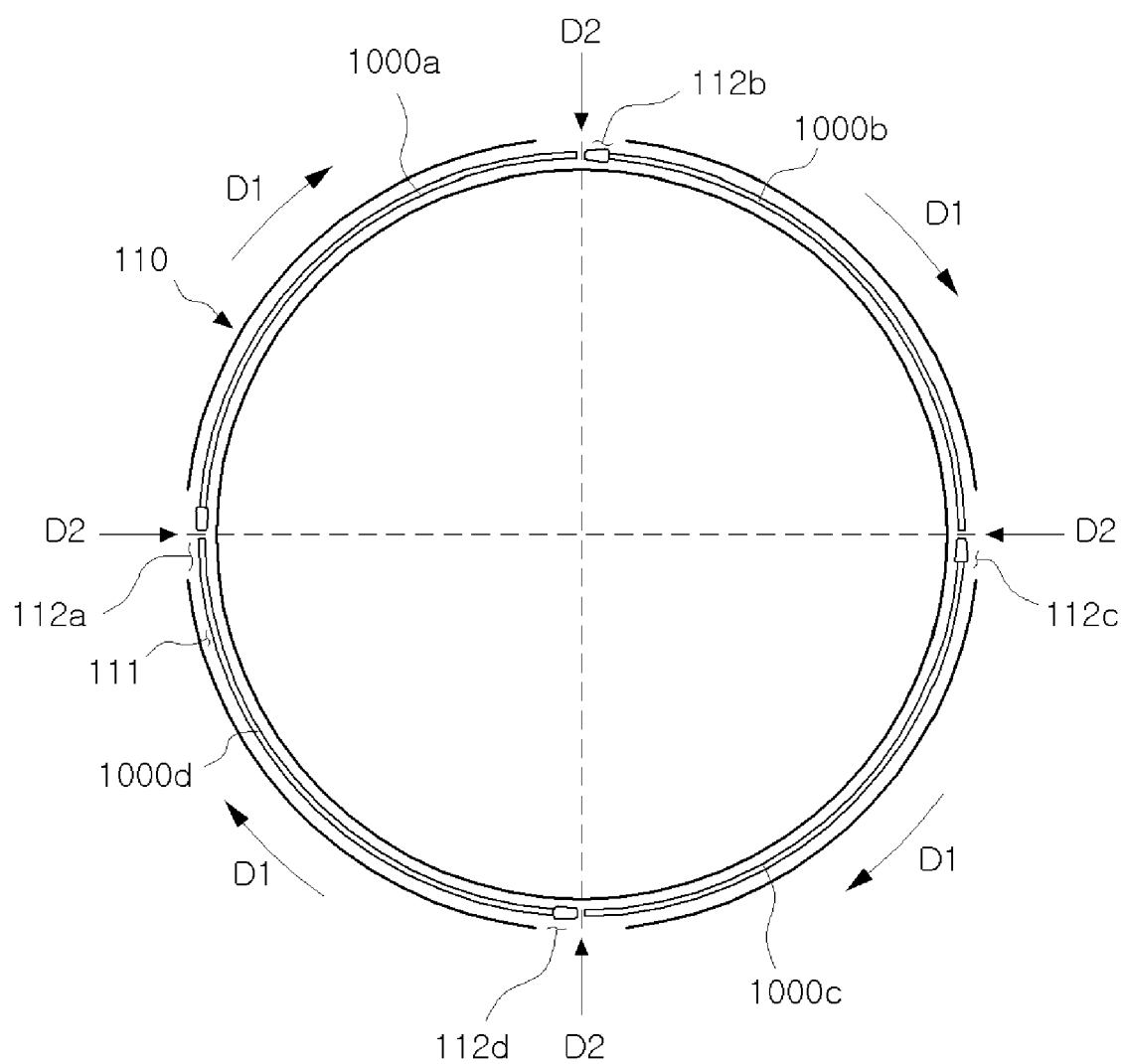
FIG. 21 is a schematic view illustrating a state in which four sealing assemblies are inserted into a turbine disk, and illustrating a state in which one end of one of sealing assemblies is inserted adjacent to the other end of another adjacent sealing assembly.

FIG. 18 is a schematic view illustrating a state in which one sealing assembly is inserted into one turbine disk, FIG. 19 is a schematic view illustrating a state in which two sealing assemblies are inserted into one turbine disk, and FIGS. 20 and 21 are schematic views illustrating a state in which four sealing assemblies are inserted into a turbine disk. For example, FIGS. 18 to 21 are schematic cross-sectional views illustrating a turbine disk 110, a sealing slot 111, and a sealing assembly 1000 when the turbine disk 110 is cut in an imaginary plane perpendicular to the axis of the turbine disk 110. In FIGS. 18 to 21, reference numeral D1 denotes a direction in which the sealing assembly 1000 is inserted, and reference numeral D2 denotes a location in which the fastening section 1300 is fastened.

Referring to FIG. 18, only one sealing assembly 1000 may be provided in one turbine disk 110. In this case, as illustrated in FIG. 5, the sealing assembly 1000 has one end 1001 and the other end 1002 disposed adjacent to each other, and the main body 1100 included in one sealing assembly 1000 seals all parts between the pair of turbine disks 110.

Referring to FIG. 19, two sealing assemblies 1000 may be provided on one turbine disk 110. Here, each of the sealing assemblies 1000a and 1000b may be inserted into the sealing slot 111 in opposite directions through one head slot 112. In this case, the two sealing assemblies 1000 are arranged such that their respective ends face each other in the state of being inserted into the sealing slot 111. In this case, the fastening section 1300 is installed in one sealing slot 111, into which the two sealing assemblies 1000 have been inserted, thereby fastening the two sealing assemblies 1000 to the turbine disk 110. On the other hand, the fastening section 1300 to be installed in the one sealing slot 111 is also provided with two fastening sections so that respective fastening sections may be installed in the sealing heads 1200 of the sealing assemblies 1000. As such, when two sealing assemblies 1000 are installed on one turbine disk 110, the two sealing assemblies 1000 perform a sealing action on two-half parts of the turbine disk 110, respectively.

Referring to FIG. 20, four sealing assemblies 1000 may be provided on one turbine disk 110. Here, among the four sealing assemblies 1000, a first sealing assembly 1000a and a second sealing assembly 1000b may be inserted into the sealing slot 111 in opposite directions through the first head slot 112a. Also, among the four sealing assemblies 1000, a third sealing assembly 1000c and a fourth sealing assembly 1000d may be inserted into the sealing slot 111 in opposite directions through the second head slot 112b. In addition, the first head slot 112a and the second head slot 112b may be formed on opposite sides with respect to the center of the turbine disk 110.

In this case, the four sealing assemblies 1000 are arranged such that one end of the first sealing assembly 1000a and one end of the third sealing assembly 1000c face each other, and one end of the second sealing assembly 1000b and one end of the fourth sealing assembly 1000d face each other. That is, the four sealing assemblies 1000 are arranged such that the other end of the first sealing assembly 1000a and the other end of the second sealing assembly 1000b face each other, and the other end of the third sealing assembly 1000c and the other end of the fourth sealing assembly 1000d face each other. The fastening sections 1300 are installed in the first head slot 112a and the second head slot 112b, respectively, to respectively fasten the first to fourth sealing assemblies 1000a to 1000d to the turbine disk 110. Thus, when the turbine rotor 100 is designed to have the above-described structure, the first to fourth sealing assemblies 1000a to 1000d perform a sealing action on four-quarter parts of the turbine disk 110, respectively.

Referring to FIG. 21, in one turbine disk 110, four head slots 112 may be formed and four sealing assemblies 1000 may be installed. Here, the first sealing assembly 1000a of the four sealing assemblies 1000 is inserted into the sealing slot 111 through the first head slot 112a of the four head slots 112. The second sealing assembly 1000b of the four sealing assemblies 1000 is inserted into the sealing slot 111 through the second head slot 112b of the four head slots 112. The third sealing assembly 1000c of the four sealing assemblies 1000 is inserted into the sealing slot 111 through the third head slot 112c of the four head slots 112. The fourth sealing assembly 1000b of the four sealing assemblies 1000 is inserted into the sealing slot 111 through the fourth head slot 112d of the four head slots 112.

The first to fourth head slots 112a to 112d are formed at positions spaced apart from each other along the circumferential direction of the turbine disk 110. In addition, the first to fourth sealing assemblies 1000a to 1000d are inserted into the first to fourth head slots 112a to 112d such that they are respectively inserted into the sealing slots 111 in the same direction. In this case, one end of one of the sealing assemblies 1000 is arranged to be adjacent to the other end of another adjacent sealing assembly 1000. In addition, the fastening sections 1300 are installed in the first to fourth head slots 112a to 112d, respectively. By designing the rotor 100 according to one or more exemplary embodiments, the first to fourth sealing assemblies 1000a to 1000d perform a sealing action on four-quarter parts of the turbine disk 110, respectively.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A rotor comprising:
   a pair of disks rotating about an imaginary central axis and arranged parallel to each other in an axial direction;
   a replaceable self-locking sealing assembly interposed between the pair of disks; and
   a fastening section disposed on the sealing assembly to fasten the sealing assembly to a disk from the pair of disks,
   wherein the disk includes a sealing slot disposed on an opposite surface to another adjacent disk and a head slot disposed outward from the sealing slot with respect to a radial direction of the disk, and
   wherein the sealing assembly includes a main body with one end inserted into the sealing slot through the head slot from an outside of the disk, and a sealing head disposed on another end of the main body to be seated on an inner wall of the head slot to restrict the main body from being moved.

2. The rotor according to claim 1, wherein the sealing slot has a ring shape extending along a circumferential direction of the disk,
   the disk includes a connection slot disposed in an inclined direction from the sealing slot toward the outside of the disk, the connection slot communicating with the sealing slot and the head slot, and the main body is inserted into the sealing slot sequentially through the head slot and the connection slot.

3. The rotor according to claim 2, wherein the disk comprises:
an insertion groove formed on an outside of the connection slot so that a tool is inserted into the insertion groove from the outside of the disk; and
an outlet groove disposed on an opposite side of the connecting slot based on the head slot to connect the sealing slot and the head slot, the outlet groove being inclined to the sealing slot in a direction opposite to an inclined direction of the connection slot to the sealing slot.

4. The rotor according to claim 2, wherein a width of the head slot is larger than a width of the connection slot based on an axial direction of the disk, and
the sealing head is disposed on an inner wall of the head slot on a side of the connection slot.

5. The rotor according to claim 3, wherein an anti-release step is formed to protrude from an inner wall of the head slot on a side of the insertion groove, and the sealing head is disposed on an inner side of the anti-release step.

6. The rotor according to claim 2, wherein a bolt hole is formed in an inner wall of the head slot on a side of the sealing slot along a radial direction of the disk, and the sealing head is disposed in a space between the connection slot and the bolt hole in the head slot,
wherein the fastening section comprises:
a fastening cap inserted into the head slot from the outside of the disk to press the sealing head inward; and
a fastening bolt inserted into the bolt hole through the fastening cap to fasten the fastening cap to the disk.

7. The rotor according to claim 6, wherein an anti-release step is formed to protrude from an inner wall of the head slot on an outside of the sealing head toward the fastening cap, and
wherein the fastening section further comprises:
a fastening step formed to protrude from the fastening cap toward an inner side of the anti-release step and inserted between the anti-release step and the sealing head.

8. The rotor according to claim 1, wherein the main body comprises:
a sealing plate;
a pair of sealing edges formed to face radially outward from the disk, respectively, from both sides of the sealing plate based on a circumferential direction of the disk; and
a buffer plate disposed on an outside of the sealing plate such that opposite sides thereof contact the pair of sealing edges, respectively.

9. The rotor according to claim 8, wherein the main body further comprises an auxiliary plate disposed on an inner side of the sealing plate, wherein opposite sides thereof have a convex curved shape.

10. The rotor according to claim 1, wherein the main body comprises:
a buffer plate;
a first sealing edge and a second sealing edge arranged to contact opposite sides of the buffer plate, respectively, based on a circumferential direction of the disk;
a first sealing plate formed to face the second sealing edge from an inner side of the first sealing edge based on a radial direction of the disk, such that a width thereof along an axial direction of the disk is smaller than a width of the buffer plate; and
a second sealing plate formed to face the first sealing edge from an inner side of the second sealing edge such that the second sealing plate contacts an inner side of the first sealing plate.

11. The rotor according to claim 10, wherein the sealing slot is configured such that the width along the axial direction of the disk gradually increases from an inner side toward an outer side based on the radial direction of the disk, and
wherein the first and second sealing edges are formed such that portions thereof connected to the first and second sealing plates contact opposite inner walls of the sealing slot based on a circumferential direction of the disk.

12. The rotor according to claim 10, wherein the sealing slot is configured such that the width along the axial direction of the disk gradually increases from an inner side toward an outer side based on the radial direction of the disk, and
wherein the first and second sealing edges are formed such that surfaces thereof on an opposite side of the buffer plate come into whole contact with opposite inner walls of the sealing slot based on the circumferential direction of the disk.

13. The rotor according to claim 1, wherein the sealing assembly includes a plurality of sealing assemblies such that respective first-side ends thereof are inserted into the sealing slot to face each other,
wherein the fastening sections are respectively disposed on second-side ends of the plurality of sealing assemblies arranged to face each other.

14. The rotor according to claim 1, wherein the sealing assembly includes a plurality of sealing assemblies such that a first end of one of the sealing assemblies is inserted into the sealing slot adjacent to a second end of another adjacent sealing assembly,
wherein the fastening section includes a plurality of fastening sections respectively disposed on second-side ends of the plurality of sealing assemblies.

15. A turbine comprising:
a stator comprising a casing and a plurality of vanes disposed on an inner circumferential surface of the casing in multi-stages along a flow direction of a combustion gas supplied from a combustor of a gas turbine; and
a rotor comprising a plurality of disks disposed in the casing in multi-stages in the flow direction of the combustion gas, a plurality of blades disposed on a radially outer side of the plurality of disks between the plurality of vanes, a sealing assembly disposed on a disk from the plurality of disks, and a fastening section configured to fasten the sealing assembly to the disk,
wherein the disk includes a main disk part on which the blades are disposed and an inter-stage disk part disposed between adjacent main disk parts,
wherein the disk includes a sealing slot disposed on an opposite surface to another adjacent disk and a head slot disposed outward from the sealing slot with respect to a radial direction of the disk, the sealing slot and the head slot being disposed on opposite surfaces of the main disk part and the inter-stage disk part, and
wherein the sealing assembly is disposed between the main disk part and the inter-stage disk part that are adjacent to each other, and includes a main body with one end inserted into the sealing slot through the head slot from an outside of the disk, and a sealing head disposed on another end of the main body to be seated on an inner wall of the head slot to restrict the main body from being moved.

16. The turbine according to claim 15, wherein the sealing slot has a ring shape extending along a circumferential direction of the disk, the disk includes a connection slot disposed in an inclined direction from the sealing slot toward the outside of the disk, the connection slot communicating with the sealing slot and the head slot, and the main body is inserted into the sealing slot sequentially through the head slot and the connection slot.

17. The turbine according to claim 16, wherein the disk includes:

an insertion groove formed on an outside of the connection slot so that a tool is inserted into the insertion groove from the outside of the disk; and an outlet groove disposed on an opposite side of the connecting slot based on the head slot to connect the sealing slot and the head slot, the outlet groove being inclined to the sealing slot in a direction opposite to an inclined direction of the connection slot to the sealing slot.

18. A gas turbine comprising:

a compressor configured to compress air drawn thereinto from an outside;

a combustor configured to mix the compressed air supplied from the compressor with fuel and combust the air-fuel mixture; and a turbine configured to be rotated by the combustion gas supplied from the combustor to generate power for generating electricity, wherein the turbine comprises:

a stator comprising a casing and a plurality of vanes disposed on an inner circumferential surface of the casing in multi-stages along a flow direction of the combustion gas; and a rotor comprising a plurality of disks disposed in the casing in multi-stages in the flow direction of the combustion gas, a plurality of blades disposed on a radially outer side of the plurality of disks between the plurality of vanes, a sealing assembly disposed on a disk from the plurality of disks, and a fastening section configured to fasten the sealing assembly to the disk, wherein the disk includes a main disk part on which the blades are disposed and an inter-stage disk part disposed between adjacent main disk parts, wherein the disk includes a sealing slot disposed on an opposite surface to another adjacent disk and a head slot disposed outward from the sealing slot with respect to a radial direction of the disk, the sealing slot and the head slot being disposed on opposite surfaces of the main disk part and the inter-stage disk part, and wherein the sealing assembly is disposed between the main disk part and the inter-stage disk part that are adjacent to each other, and includes a main body with one end inserted into the sealing slot through the head slot from an outside of the disk, and a sealing head disposed on another end of the main body to be seated on an inner wall of the head slot to restrict the main body from being moved.

19. The gas turbine according to claim 18, wherein the sealing slot has a ring shape extending along a circumferential direction of the disk, the disk includes a connection slot disposed in an inclined direction from the sealing slot toward the outside of the disk, the connection slot communicating with the sealing slot and the head slot, and the main body is inserted into the sealing slot sequentially through the head slot and the connection slot.

20. The gas turbine according to claim 19, wherein the disk includes:

an insertion groove formed on an outside of the connection slot so that a tool is inserted into the insertion groove from the outside of the disk; and an outlet groove disposed on an opposite side of the connecting slot based on the head slot to connect the sealing slot and the head slot, the outlet groove being inclined to the sealing slot in a direction opposite to an inclined direction of the connection slot to the sealing slot.

* * * * *